United States Patent
Lewis et al.

(10) Patent No.: US 10,026,560 B2
(45) Date of Patent: *Jul. 17, 2018

(54) SOLAR FUELS GENERATOR

(71) Applicant: CALIFORNIA INSTITUTE OF TECHNOLOGY, Pasadena, CA (US)

(72) Inventors: Nathan S. Lewis, La Canada Flintridge, CA (US); Joshua M. Sprugeon, Los Angeles, CA (US); William C. West, South Pasadena, CA (US); Chengxiang Xiang, Pasadena, CA (US)

(73) Assignee: THE CALIFORNIA INSTITUTE OF TECHNOLOGY, Pasadena, CA (US)

( * ) Notice: Subject to any disclaimer, the term of this patent is extended or adjusted under 35 U.S.C. 154(b) by 1056 days.

This patent is subject to a terminal disclaimer.

(21) Appl. No.: 13/947,868

(22) Filed: Jul. 22, 2013

(65) Prior Publication Data
US 2014/0021034 A1     Jan. 23, 2014

Related U.S. Application Data

(63) Continuation-in-part of application No. 13/855,515, filed on Apr. 2, 2013, and a continuation-in-part of
(Continued)

(51) Int. Cl.
C25B 1/00     (2006.01)
C25B 9/08     (2006.01)
H01G 9/20     (2006.01)

(52) U.S. Cl.
CPC .............. *H01G 9/20* (2013.01); *C25B 1/003* (2013.01); *C25B 9/08* (2013.01)

(58) Field of Classification Search
CPC .... C25B 1/003; C25B 1/02–1/12; C25B 9/08; H01G 9/20
See application file for complete search history.

(56) References Cited

U.S. PATENT DOCUMENTS 4,215,182 A     7/1980  Ang et al.
4,235,955 A *  11/1980  Sammells ................ H01G 9/20
                                                        429/111
(Continued)

FOREIGN PATENT DOCUMENTS

CN     1669920 A     9/2005
CN     1808688 A     7/2006
(Continued)

OTHER PUBLICATIONS

Alexiev et al., "Minority Carrier Diffusion Lengths for High Purity Liquid Epilaxial GaAs", pp. 1-8, Nov. 1, 2004, obtained online from http://arxiv.org/ftp/cond-mat/papers/0409/0409176.pdf.
(Continued)

*Primary Examiner* — Ciel P Thomas
(74) *Attorney, Agent, or Firm* — Gavrilovich, Dodd & Lindsey LLP

(57)     ABSTRACT

The solar fuels generator includes an ionically conductive separator between a gaseous first phase and a second phase. A photoanode uses one or more components of the first phase to generate cations during operation of the solar fuels generator. A cation conduit is positioned provides a pathway along which the cations travel from the photoanode to the separator. The separator conducts the cations. A second solid cation conduit conducts the cations from the separator to a photocathode.

28 Claims, 8 Drawing Sheets

Related U.S. Application Data application No. 13/740,185, filed on Jan. 12, 2013, now abandoned.

(60) Provisional application No. 61/674,215, filed on Jul. 20, 2012, provisional application No. 61/619,316, filed on Apr. 2, 2012, provisional application No. 61/586,621, filed on Jan. 13, 2012.

(56) References Cited

U.S. PATENT DOCUMENTS

| | | | |
|---|---|---|---|
| 4,358,676 A | 11/1982 | Childs et al. | |
| 5,314,569 A | 5/1994 | Pribat | |
| 5,336,558 A | 8/1994 | Debe | |
| 5,352,651 A | 10/1994 | Debe | |
| 5,468,699 A | 11/1995 | Zhang et al. | |
| 5,976,957 A | 11/1999 | Westwater et al. | |
| 6,306,734 B1 | 10/2001 | Givargizov | |
| 6,649,824 B1 | 11/2003 | Den | |
| 7,057,881 B2 | 6/2006 | Chew et al. | |
| 7,105,428 B2 | 9/2006 | Pan et al. | |
| 7,109,517 B2 | 9/2006 | Zaidi | |
| 7,116,546 B2 | 10/2006 | Chew | |
| 7,148,417 B1 | 12/2006 | Landis | |
| 7,238,594 B2 | 7/2007 | Fenash et al. | |
| 7,253,017 B1 | 8/2007 | Roscheisen et al. | |
| 7,253,442 B2 | 8/2007 | Huang | |
| 7,259,324 B2 | 8/2007 | Zeira | |
| 7,309,620 B2 | 12/2007 | Fonash et al. | |
| 7,335,259 B2 | 2/2008 | Hanrath et al. | |
| 7,560,366 B1 | 7/2009 | Romano et al. | |
| 7,666,708 B2 | 2/2010 | Lieber et al. | |
| 7,998,788 B2 | 8/2011 | Guha et al. | |
| 8,105,474 B2 | 1/2012 | Fan | |
| 2002/0172820 A1 | 11/2002 | Majumdar et al. | |
| 2003/0230337 A1* | 12/2003 | Gaudiana | H01G 9/2031 |
| | | | 136/256 |
| 2004/0213307 A1 | 10/2004 | Lieber et al. | |
| 2005/0009224 A1 | 1/2005 | Yang et al. | |
| 2005/0205128 A1 | 9/2005 | Deng et al. | |
| 2005/0211290 A1* | 9/2005 | Deng | C25B 1/003 |
| | | | 136/252 |
| 2005/0227391 A1 | 10/2005 | Jin et al. | |
| 2005/0253138 A1 | 11/2005 | Choi et al. | |
| 2005/0279274 A1 | 12/2005 | Niu et al. | |
| 2006/0118791 A1 | 6/2006 | Leu | |
| 2006/0207647 A1 | 9/2006 | Tsakalakos et al. | |
| 2007/0032076 A1 | 2/2007 | Lee et al. | |
| 2007/0119706 A1 | 5/2007 | McNulty et al. | |
| 2007/0122313 A1 | 5/2007 | Li et al. | |
| 2007/0166899 A1 | 7/2007 | Yao et al. | |
| 2007/0232028 A1 | 10/2007 | Lee et al. | |
| 2007/0278476 A1 | 12/2007 | Black | |
| 2008/0047604 A1 | 2/2008 | Korevaar et al. | |
| 2008/0072961 A1 | 3/2008 | Liang et al. | |
| 2008/0075954 A1 | 3/2008 | Wardle et al. | |
| 2008/0093698 A1 | 4/2008 | Tsakalakos et al. | |
| 2008/0110486 A1 | 5/2008 | Tsakalakos et al. | |
| 2008/0134089 A1 | 6/2008 | Tsakalakos et al. | |
| 2008/0149174 A1 | 6/2008 | Chen et al. | |
| 2008/0169017 A1 | 7/2008 | Korevaar et al. | |
| 2008/0315430 A1 | 12/2008 | Weber et al. | |
| 2009/0020150 A1 | 1/2009 | Atwater et al. | |
| 2009/0020853 A1 | 1/2009 | Kayes et al. | |
| 2009/0026070 A1 | 1/2009 | Fan et al. | |
| 2009/0050204 A1 | 2/2009 | Habib | |
| 2009/0057839 A1 | 3/2009 | Lewis et al. | |
| 2009/0065048 A1 | 3/2009 | Dasgupta et al. | |
| 2009/0074611 A1* | 3/2009 | Monzyk | A61L 2/02 |
| | | | 422/29 |
| 2009/0127540 A1 | 5/2009 | Taylor | |
| 2009/0152527 A1 | 6/2009 | Lee et al. | |
| 2009/0266411 A1 | 10/2009 | Habib et al. | |
| 2009/0272645 A1* | 11/2009 | Yang | C25B 1/06 |
| | | | 204/265 |
| 2010/0028736 A1 | 2/2010 | Unlu et al. | |
| 2011/0042229 A1 | 2/2011 | Fan | |
| 2011/0192464 A1 | 8/2011 | Urano et al. | |
| 2011/0214996 A1* | 9/2011 | Yoshida | C01B 3/04 |
| | | | 205/633 |
| 2011/0278176 A1 | 11/2011 | He | |
| 2012/0138456 A1 | 6/2012 | Spurgeon et al. | |
| 2013/0026029 A1 | 1/2013 | Kayaert et al. | |
| 2013/0092549 A1* | 4/2013 | Spurgeon | H01L 31/0586 |
| | | | 205/340 |

FOREIGN PATENT DOCUMENTS

| | | |
|---|---|---|
| EP | 0117246 A | 7/1980 |
| JP | 11-214720 | 8/1999 |
| JP | 2005-310388 | 4/2005 |
| JP | 2005-194609 | 7/2005 |
| JP | 2011-116581 A | 6/2011 |
| KR | 10-2007-18457 | 2/2007 |
| WO | 2003005450 A2 | 1/2003 |
| WO | 2005084336 A2 | 9/2005 |
| WO | 2006138671 A2 | 12/2006 |
| WO | 2007066087 A2 | 6/2007 |
| WO | 2008135905 A2 | 11/2008 |
| WO | 2010016555 A1 | 2/2010 |
| WO | 2010137014 A2 | 12/2010 |
| WO | 20100137014 A2 | 12/2010 |

OTHER PUBLICATIONS

Anandan et al., "Room temperature growth of CuO nanorod arrays on copper and their application as a cathode in dye-sensitized solar cells", Materials Chemistry an Physics, vol. 93, Issue 1, Sep. 15, 2005, pp. 35-40.

Anandan et al., "Recent improvements and arising challenges in dye-sensitized solar cells", Solar Energy Materials and Solar Cells, vol. 91, Issue 9, May 23, 2007, pp. 843-846.

Basol et al., "Ultra-Thin Electrodeposited CdS/CdTe Heterojunction with 8% Efficiency", IEEE Photo. Spec. Conf., 1982, 805-808.

Basol, B., "High-efficiency electroplated heterojunction solar cell", J. Appl. Phys. 55(2), 1984, pp. 601-603.

Basol, B., "Thin Film CdTe Solar Cells—A Review", Conf. Rec. IEEE Photo. Spec. Conf., 1990, 588-594.

Bhattacharya et al., "Electrodeposition of CdTe Thin Films", 1984, 131, 2032-2041.

Bogart et al., "Diameter-Controlled Synthesis of Silicon Nanowires Using Nanoporous Alumina Membranes", Adv. Mater. 2005, 17 (1), 114-117.

Bullis, W.M., "Properties of Gold in Silicon", Solid-State Electronics, Pergamon Press, 1966, vol. 9, pp. 143-168.

Choi, Jeong Yoon, Search Report for PCT/US2008/070509, Korean Intellectual Property Office, dated Feb. 20, 2009.

Choi, Jeong Yoon, Written Opinion for PCT/US2008/070509, Korean Intellectual Property Office, dated Feb. 20, 2009.

Chu et al., "Large Area Polycrystalline Silicon Solar Cells on Unidirectionally Solidified Acid-Treated Metallurigcal Grade Silicon", Proc. IEEE Southeastcon, 1989, 1436-1441.

Davis, Jr. et al., "Impurities in Silicon Solar Cells", IEEE Transactions on Electron Devices, vol. ED-27, No. 4, Apr. 1980, 677.

de Dood, Michiel Jacob Andries, "Silicon photonic crystals and spontaneous emission", Thesis, Utrecht University, 2002.

Erts et al., "High Density Germanium Nanowire Assemblies: Contact Challenges and Electrical Characterization", J. Phys. Chem. B2006, 110, 820-826.

Fan et al., "Semiconductor Nanowires: From Self-Organization to Patterned Growth", Small 2(6), 700-717 (2006).

Fan et al., "Well-ordered ZnO nanowire arrays on GaN substrate fabricated via nanosphere lithography", Journal of Crystal Growth, 287 (2006) 34-38.

Fang et al., "Long Germanium Nanowires Prepared by Electrochemical Etching", Nano Letters, vol. 6, No. 7, pp. 1578-1580, 2006, available online Jun. 16, 2006.

Fulop et al., "High-efficiency electrodeposited cadmium telluride solar cells", Appl. Phys. Lett., 1982, 40, 327-328.

(56) References Cited

OTHER PUBLICATIONS

Gibbons et al., "A 14% efficient nonaqueous semiconductor/liquid junction solar cell", Appl. Phys. Lett., 1984, 45, 1095-1097.
Givargizov, "Growth of Whiskers from the Vapor Phase", Highly Anisotropic Crystals, D. Reidel, Dordrecht, Holland, 1987, p. 169.
Goodey et al., "Silicon Nanowire Array Photoelectrochemical Cells", J. Am. Chem. Soc., 2007, 129 (41), 12344-12345.
Gowrishankar et al., "Fabrication of densely packed, well-ordered, high-aspect-ratio silicon nanopillars over large areas using block copolymer lithography", Thin Solid Films, 2006, 513, 289-294.
Gronet et al., "n-Type silicon photoelectrochemistry in methanol: Design of a 10.1% efficient semiconductor/liquid junction solar cell", Proc. Natl. Acad. Sci. USA, vol. 80, pp. 1152-1156, Feb. 1983.
Gstrein et al., "Effects of Interfacial Energetics on the Effective Surface Recombination Velocity of Si/Liquid contacts", J. Phys. Chem., B2002, 106, 2950-2961.
Gu et al., "Quantitative Measurement of the Electron and Hole Mobility-Lifetime Products in Semiconductor Nanowires", Nano Letters, 2006, vol. 6, No. 5, 948-952.
Guo, L. Jay, "Nanoimprint Lithography: Methods and Material Requirements", Advanced Materials, 19, 495-513, 2007.
Haick et al., "Electrical Characteristics and Chemical Stability of Non-Oxidized, Methyl-Terminated Silicon Nanowires", J. Am. Chem. Soc., 2006, 128, 8990-8991.
Harris et al., "Semiconductors for Photoelectrolysis", Ann Rev. Mater. Sci., 1978, 8:99-134.
Haxel et al., "Rare Earth Elements—Critical Resources for High Technology", U.S. Geological Survey Fact Sheet, 087-02, 2002, p. 3.
Hochbaum et al., "Controlled Growth of Si Nanowire Arrays for Device Integration", Nano Letters, 2005, vol. 5, No. 3, 457-460.
Hopkins et al., "Impurity Effects in Silicon for High Efficiency Solar Cells", Journal of Crystal Growth 75 (1986) 67-79.
Huang et al., "Fabrication of Silicon Nanowire Arrays with Controlled Diameter, Length, and Density", Advanced Materials, 19, 744-748 (2007).
Huynh et al., "Hybrid Nanorod-Polymer Solar Cells", Science, 295, 2425 (2002).
Ismail et al., "Hydrogen Gas Production for Electronic-Grade Polycrystalline Silicon Growth", IEEE ICSE, 2002, 53-56.
Jacoboni et al., "A Review of Some Charge Transport Properties of Silicon", Solid State Electronics, 1977, vol. 20, 77-89.
Jenny et al., "Semiconducting Cadmium Telluride", Physical Review, vol. 96, No. 5, Dec. 1, 1954, 1190-1191.
Jung et al., "Aligned Carbon Nanotube-Polymer Hybrid Architectures for Diverse Flexible Electronic Applications", Nano Letters, 2006, vol. 6, No. 3, pp. 413-418.
Kang et al., "Hybrid solar cells with vertically aligned CdTe nanorods and a conjugated polymer", Applied Physics Letters, 86, Issue 11, 113101-1-113101-3 (2005).
Kang et al., "Well-aligned CdS nanorod/conjugated polymer solar cells", Solar Energy Materials and Solar Cells, vol. 90, Issue 2, Jan. 23, 2006, pp. 166-174.
Kawano et al., "Fabrication and properties of ultrasmall Si wire arrays with circuits by vapor-liquid-solid growth", Sensors and Actuators, A 97-98 (2002) 709-715.
Kayes et al., "Comparison of the device physics principles of planar and radial p-n junction nanorod solar cells", Journal of Applied Physics, 2005, 97:114302.1-114302.11.
Kayes et al., "Radial PN Junction Nanorod Solar Cells: Device Physics Principles and Routes to Fabrication in Silicon", IEEE PVSC, 2005, pp. 55-58.
Kayes et al., "Synthesis and Characterization of Silicon Nanorod Arrays for Solar Cell Applications", IEEE WCPEC, 2006, 1, 221-224.
Kayes et al., "Growth of vertically aligned Si wire arrays over large areas (>1cm2) with Au and Cu Catalysts", Supplementary Material, App. Phys. Letter, 91, 103110 (2007).

Kelzenberg et al., "Photovoltaic Measurements in Single-Nanowire Silicon Solar Cells", Nano Letters, 2008, vol. 8, No. 2, pp. 710-714.
Kim et al., "Photovoltaic Properties of Nano-particulate and Nanorod Array ZnO Electrodes for Dye-Sensitized Solar Cell," Bull. Korean Chem. Soc., vol. 27, No. 2, 295-298, Feb. 2006.
Kim et al., "Stretchable and Foldable Silicon Integrated Circuits", Science, 2008, 320, 507-511.
Klein et al., "Electrochemcial Fabrications of Cadmium Chalcogenide Microdiode Arrays", Chem. Mater., 1993, 5, 902-904.
Kressin et al., "Synthesis of Stoichiometric Cadmium Selenide Films via Sequential Monolayer Electrodeposition", Chem. Mater., 1991, 3, 1015-1020.
Lauhon et al., "Epitaxial core-shell and core-multishell nanowire heterostructures", Nature, vol. 420, Nov. 7, 2002, pp. 57-61.
Law et al., "Semiconductor Nanowires and Nanotubes", Annu. Rev. Mater. Res., 2004, 34:83-122.
Law et al., "Nanowire dye-sensitized solar cells", Nat. Mater., 2005, 4, 455-459.
Lee et al., "Solvent Compatibility of Poly(dimethylsiloxane)-Based Microfluidic Devices", Anal. Chem., 2003, 75, 3544-6554.
Lee, Dong Wook, International Search Report and Written Opinion, PCT/US2013/051413, Korean Intellectual Property Office, dated Oct. 24, 2013.
Lepiller et al., "New Facets of CdTe Electrodeposition in Acidic Solutions with Higher Tellurium Concentrations", Journal of the Electrochemical Society, 151 (5) C348-C357, 2004.
Lin et al., Efficient photoinduced charge transfer in TiO2 nanorod/ conjugated polymer hybrid materials, Nanotechnology, 17 (2006), 5781-5785.
Lindner, Nora, International Preliminary Report on Patentability, PCT/US2013/035026, The International Bureau of WIPO, dated Oct. 16, 2014.
Lombardi et al., "Synthesis of High Density, Size-Controlled Si Nanowire Arrays via Porous Anodic Alamina Mask", Chem. Mater., 2006, 18, 988-991.
Lopatiuk-Tripak, "Studies of minority carrier transport in ZnO", Superlattices and Microstructures, vol. 42, Issues 1-6, Jul.-Dec. 2007, pp. 201-205, Available online May 25, 2007.
Maiolo et al., "High Aspect Ratio Silicon Wire Array Photoelectrochemical Cells", J. Am. Chem. Soc., 129, 2007, 12346-12347.
Maiolo et al., "Macroporous Silicon as a Model for Silicon Wire Array Solar Cells", J. Phys. Chem. C 2008, 112, 6194-6201.
Martensson et al., "Fabrication of individually seeded nanowire arrays by vapour-liquid-solid growth", Nanotechnology, 14 (2003) 1255-1258.
McCandless et al., "Cadmium Telluride Solar Cells", In Handbook of Photovoltaic Science and Engineering, 2003, pp. 617-657.
McDonald et al., "Poly(dimethylsiloxane) as a Material for Fabricating Microfluidic Devices", Acc. Chem. Res., 2002, 35 (7), 491-499.
Meissner et al., "Light-Induced Generation of Hydrogen at CdS-Monograin Membranes", Chemical Physics Letters, vol. 96, No. 1, Mar. 25, 1983, pp. 34-37.
Mohan et al., "Controlled growth of highly uniform, axial/radial direction-defined, individually addressable InP nanowire arrays", Nanotechnology 16 (2005) 2903-2907.
Morales et al., "A Laser Ablation Method for the Synthesis of Crystalline Semiconductor Nanowires", Science, 79, 208-211 (1998).
Morin et al., "Biomimetic Assembly of Zinc Oxide Nanorods onto Flexible Polymers", J. Am. Chem. Soc., 2007, 129 (45), 13776-13777.
Nakamura, Yukari, International Preliminary Report on Patentability and Written Opinion, PCT/US2013/051413, The International Bureau of WIPO, dated Jan. 29, 2015.
Nickitas-Etienne, Athina, International Preliminary Report on Patentability, PCT/US2013/021339, The International Bureau of WIPO, dated Jul. 24, 2014.
Park, Jae Hun, Search Report for PCT/US2008/070495, Korean Intellectual Property Office, dated Feb. 20, 2009.
Park, Jae Hun, Written Opinion for PCT/US2008/070495, Korean Intellectual Property Office, dated Feb. 20, 2009.

(56) References Cited

OTHER PUBLICATIONS

Park, Jae Hun, Search Report for PCT/US2008/070523, Korean Intellectual Property Office, dated Feb. 20, 2009.
Park, Jae Hun, Written Opinion for PCT/US2008/070523, Korean Intellectual Property Office, dated Feb. 20, 2009.
Park, Jae Hun, Search Report for PCT/US2008/070518, Korean Intellectual Property Office, dated Feb. 20, 2009.
Park, Jae Hun, Written Opinion for PCT/US2008/070518, Korean Intellectual Property Office, dated Feb. 20, 2009.
Paulson et al., "Spectroscopic ellipsometry investigation of optical and interface properties of CdTe films deposited on metal foils", Solar Energy Materials & Solar Cells, 82 (2004) 279-90.
Peng et al., "Fabrication of Large-Area Silicon Nanowire p-n Junction Diode Arrays", Adv. Mater., 2004, 16 (1), 73-76.
Peng et al., "Aligned Single-Crystalline Si Nanowire Arrays for Photovoltaic Applications", Small, 2005, 1, 1062-1067.
Pushparaj et al., "Flexible energy storage devices based on nanocomposite paper", PNAS, Aug. 21, 2007, vol. 104, No. 34, pp. 13574-13577.
Raravikar et al., "Embedded Carbon-Nanotube-Stiffened Polymer Surfaces", Small, 1 (3), 317 (2005).
Rosenbluth et al., "630-mV open circuit voltage, 12% efficient n-Si liquid junction", Appl. Phys. Lett., 1985, 45, 423-425.
Rosenbluth et al., "Kinetic Studies of Carrier Transport and Recombination at the n-Silicon/Methanol Interface", Journal of the American Chemical Society, vol. 108, No. 16, Aug. 6, 1986, pp. 4689-4695.
Rosenbluth et al., "'Ideal' Behavior of the Open Circuit Voltage of Semiconductor/Liquid Junctions", 1989, 93, 3735-3740.
Routkevitch et al., "Electrochemical Fabrication of CdS Nanowire Arrays in Porous Anodic Aluminum Oxide Templates", J. Phys. Chem. 1996, 100, 14037-14047.
Routkevitch et al., "Nonlithographic nano-wire arrays: fabrication, physics, and device applications", IEEE Transactions on Electron Devices, vol. 43, Issue 10, Oct. 1996, pp. 1646-1658.
Sansom et al., "Controlled partial embedding of carbon nanotubes within flexible transparent layers", Nanotechnology, 19, 035302 (2008).
Sayad et al., "Determination of diffusion length in photovoltaic crystalline silicon by modelisation of light beam induced current", Superlattices and Microstructures, vol. 45, Issues 4-5, Apr.-May 2009, pp. 393-401.
Schmidt et al., "Diameter-Dependent Growth Direction of Epitaxial Silicon Nanowires", Nano Letters, 2005, vol. 5, No. 5, 931-935.
Shchetinin et al., "Photoconverters Based on Silicon-Crystal Whiskers", Translated from Izmerital'naya Teknika, No. 4, pp. 35-36, 1978.
Shimizu et al., "Synthesis of Vertical High-Density Epitaxial Si(100) Nanowire Arrays on a Si(100) Substrate Using an Anodic Aluminum Oxide Template", Advanced Materials, 19, 917-920 (2007).
Struthers, J.D., "Solubility and Difusivity of Gold, Iron, and Copper in Silicon", J. Appl. Phys, 27, 1956, p. 1560.
Sunden et al., "Microwave assisted patterning of vertically aligned carbon nanotubes onto polymer substrates", J. Vac. Sci. Technol. B 24(40 Jul./Aug. 2006, pp. 1947-1950.
Sze, M., "Physics of Semiconductor Devices", 2nd Edition, Wiley, New York, 1981, p. 21.
Thai, Luan C., Non-Final Office Action, U.S. Appl. No. 12/176,100, USPTO, dated Jan. 6, 2010.
Touskova et al., "Preparation and characterization of CdS/CdTe film solar cells", Thin Solid Films, vol. 293, Issues 1-2, Jan. 30, 1997, pp. 272-276.
Tsakalakos et al., "Silicon nanowire solar cells", Applied Physics Letters, 91, 2007, 233117-1-233117-3.
Tsakalakos et al., "Strong broadband optical absorption in silicon nanowire films", J. of Nanophotonics, 2007, 1 , 013552-1-013552-10.
Wagner et al., "Vapor-Liquid-Solid Mechanism of Single Crystal Growth", Applied Physics Letters, Mar. 1, 1964, vol. 4, No. 5, pp. 89-90.
Wagner et al., "The Vapor-Liquid-Solid Mechanism of Crystal Growth and Its Application to Silicon", Trans. Metal. Soc. AIME, 1965, 233 (6), 1053-1064.
Wang et al., "Titania-nanotube-array-based photovoltaic cells", Applied Physics Letters, 89, 023508, (3 pages), published online Jul. 12, 2006.
Westwater et al., "Control of the Size and Position of Silicon Nanowires Grown via the Vapor-Liquid-Solid Technique", Jpn. J. Appl. Phys., vol. 36 (1997) pp. 6204-6209.
Westwater et al., "Si Nanowires Grown via the Vapour-Liquid Solid Reaction", Phys. Stat. Sol., vol. 165, Issue, 37, pp. 37-42 (1998).
Woodruff et al., "Vertically Oriented Germanium Nanowires Grown from Gold Colloids on Silicon Substrates and Subsequent Gold Removal", Nano Letters, 2007, vol. 7, No. 6, 1637-1642.
Wu et al., "A Study on Deep Etching of Silicon Using Ethylene-Diamine-Pyrocatechol-Water", Sensors and Actuators, 9 (1986) 333-343.
Wu et al., "Semiconductor nanowire array: potential substrates for photocatalysis and photovoltaics", Topics in Catal., 2002, 19 (2), 197-202.
Xia et al., "One-Dimensional Nanostructures: Synthesis, Characterization, and Applications", Adv. Mater., 2003, 15(5), 353-389.
Yang et al., "Experimental Observation of an Extremely Dark Material by a Low-Density Nanotube Array", Nano Letters, 2008, vol. 8, No. 2, 446-451.
Yao et al., "Si nanowires synthesized with Cu catalyst", Materials Letters, 61 (2007), pp. 177-181.
Yoon et al., "Minority carrier lifetime and radiation damage coefficients of germanium—Conference Record of the Thirty-first IEEE", Photovoltaic Specialists Conference, Jan. 3-7, 2005, pp. 842-845.
Yu et al., "Silicon Nanowires: Preparation, Device Fabrication, and Transport Properties", J. Phys. Chem. B 2000, 104, 11864-11870.
Yu et al., "Large-area blown bubble films of aligned nanowires and carbon nanotubes", Nat. Nanotechnol., 2007, 2 (6) 372-377.
Zach et al., "Synthesis of Molybdenum Nanowires with Millimeter-Scale Lengths Using Electrochemical Step Edge Decoration", Chem. Mater. 2002, 14, 3206-3216.

* cited by examiner

SOLAR FUELS GENERATOR

CROSS REFERENCE TO RELATED APPLICATIONS

This application claims the benefit of U.S. Provisional Patent Application Ser. No. 61/674,215, filed on Jul. 20, 2012, and incorporated herein in its entirety and this application is a continuation-in-part of U.S. patent application Ser. No. 13/855,515, filed on Apr. 2, 2013, and incorporated herein in its entirety which claims the benefit of U.S. Provisional Patent Application Ser. No. 61/619,316, filed on Apr. 2, 2012, and incorporated herein in its entirety and is a continuation-in-part of U.S. patent application Ser. No. 13/740,185, filed on Jan. 1, 2013, and incorporated herein in its entirety which claims the benefit of U.S. Provisional Patent Application Ser. No. 61/586,621, filed Jan. 13, 2012, the disclosure of which is incorporated herein by reference in its entirety.

STATEMENT REGARDING FEDERALLY SPONSORED RESEARCH

This invention was made with government support under DE-SC0004993/T-105732, DE-SC0004993/T-105569 and DE-SC0004993/T-105779 awarded by the Department of Energy (JCAP). The government has certain rights in the invention. The invention described herein was made in the performance of work under a NASA contract, and is subject to the provisions of Public Law 96-517 (35 USC 202) in which the Contractor has elected to retain title.

FIELD OF THE INVENTION

The invention relates to solar generators, and more particularly, to solar fuels generators.

BACKGROUND

Solar cells are used to generate electrical energy from sunlight. While these cells can generate electricity from sunlight, they do not efficiently store the generated energy. As a result, the energy must be used immediately or stored in devices such as batteries. Storing large amounts of energy in batteries is impractical and expensive. An alternative to storing solar energy in a device is to convert the solar energy into a fuel that can be used at a later time. A solar fuels generator is a device that converts the energy from the sun and water into a fuel such as hydrogen fuel. As a result, there is a need for a practical solar fuels generator.

SUMMARY

The disclosure provides a solar fuels generator, comprising one or more power generating components and one or more fuel generating components; the one or more fuel generating components including a separator having a first surface and second surface located between an oxidation catalyst and a reduction catalyst; the one or more power generating components including a pair of electrodes, at least one being a photoelectrode light absorber; and an electrical conduit providing electrical communication between the electrodes and the catalysts. In one embodiment, the one or more power generating components includes a photoanode light absorber and a photocathode light absorber; an anode electrical conduit providing electrical communication between the photoanode light absorber and the oxidation catalyst; and a cathode electrical conduit providing electrical communication between the photocathode light absorber and the reduction catalyst. In another embodiment, the separator comprises a polymer mesh coated with a conducting polymer material and containing a plurality of photoactive structures that serve as photoelectrodes; wherein the conducting polymer is adhered to the polymer mesh substrate to form the separator, wherein the plurality of photoactive structures are embedded in the separator, and wherein all or a subset of the structures embedded in the membrane extend entirely through the separator. In yet another embodiment, a portion of the separator is sufficiently free of embedded photoactive structures; wherein this sufficiently free portion of the separator allows for cation or anion conduction. In another embodiment of either of the foregoing, the polymer mesh has a pore size of about 1-100 µm or more. In another embodiment of any of the foregoing the separator is an ionomer. In yet another embodiment of any of the foregoing the first surface of the separator is coated with one or more reduction catalysts. In a further embodiment, the one or more reduction catalysts are in contact with the photoactive structure. In yet a further embodiment of any of the foregoing the second surface of the separate is coated with one or more oxidation catalysts. In yet a further embodiment, the one or more oxidation catalysts are in contact with the photoactive structure. In any of the foregoing an ion conduit can substantially covers the reduction catalysts and oxidation catalysts. In another embodiment, the anode electrical conduit is in direct physical contact with the photoanode light absorber and the cathode electrical conduit is in direct physical contact with the photocathode light absorber. In yet another embodiment, the anode electrical conduit includes an oxidation side electrical conductor in contact with a layer that includes the oxidation catalyst, the oxidation side electrical conductor being porous. In a further embodiment, the porous oxidation side electrical conductor includes a component selected from a group consisting of metal mesh, metal nanowires, conductive carbon cloth, carbon fibers, and carbon nanotubes. In a still further embodiment, the anode electrical conduit includes an anode electrical conductor that is optically transparent. In another embodiment, the anode electrical conduit includes an anode electrical conductor that is optically transparent and is positioned over a surface of the photoanode light absorber such that the anode electrical conductor is over about 5% to 100% of the surface of the photoanode light absorber. In another embodiment, the cathode electrical conduit includes a reduction side electrical conductor in contact with a layer that includes the reduction catalyst, the reduction side electrical conductor being porous. In a further embodiment, the porous reduction side electrical conductor includes a component selected from a group consisting of metal mesh, metal nanowires, conductive carbon cloth, carbon fibers, and carbon nanotubes. In still a further embodiment the cathode electrical conduit includes a cathode electrical conductor that is optically transparent. In another embodiment, the cathode electrical conduit includes a cathode electrical conductor that is optically transparent and is positioned over a surface of the photocathode light absorber such that the cathode electrical conductor is over about 5% to 100% of the surface of the photocathode light absorber. In yet another embodiment, a layer that includes the oxidation catalyst is not in direct physical contact with the photoanode light absorber. In yet another embodiment, a layer that includes the reduction catalyst is not in direct physical contact with the photocathode light absorber. In another embodiment, a layer that includes the oxidation catalyst covers about 1% to 100% of a surface of the separator. In another embodiment, the oxidation catalyst covers about 1 to 100% of the first surface of the separator. In yet another embodiment, each of the one or more power generating components contacts the first phase and the second phase and each of the one or more fuel generating components contacts the first phase and the second phase. In another embodiment, one or more power generating components and one or more fuel generating components are linked together so as to form a barrier between a first phase and a second phase. In yet another embodiment, the barrier consists of the one or more power generating components and one or more fuel generating components.

The disclosure also provides a solar fuels generator, comprising an ionically conductive separator between a first phase and a second phase; a photoanode that uses one or more components of the first phase to generate cations during operation of the solar fuels generator; and a cation conduit positioned so as to provide a pathway along which the cations travel from the photoanode to the separator. In one embodiment, the photoanode includes an oxidation catalyst. In another embodiment, the pathway extends from the oxidation catalyst to the separator. In yet a further embodiment, the photoanode extends outward from a first side of a separator; and a photocathode extends outward from a second side of the separator, the second side being opposite from the first side. In any of the foregoing embodiments, the cation conduit is in direct physical contact with the separator. In yet another embodiment of any of the foregoing the photoanode includes an oxidation catalyst between the cation conduit and a side of the photoanode. In yet another embodiment of any of the foregoing the cation conduit is in direct physical contact with the separator and extends outward from the separator along a side of the photoanode. In yet another embodiment of any of the foregoing the photoanode is one of a plurality of photoanodes that each uses one or more components of the first phase to generate cations during operation of the solar fuels generator. In yet another embodiment of any of the foregoing the cation conduit is the same material as the separator. In yet another embodiment of any of the foregoing the cation conduit is the same material as the separator and the cation conduit is continuous with the separator. In yet another embodiment of any of the foregoing the first phase is a gas that includes water vapor, the second phase is a gas, and the photoanode is configured to use the water vapor to generate the cations. In yet another embodiment of any of the foregoing the cation conduit includes a copolymer of a substituted or unsubstituted alkylene and an acid. In yet another embodiment of any of the foregoing the acid is a sulfonic acid. In yet another embodiment of any of the foregoing the separator conducts the cations. In yet another embodiment of any of the foregoing the pathway extends from the separator to a portion of the photoanode that is distant from the separator. In yet another embodiment of any of the foregoing the solar generator further comprises a photocathode generates the solar fuel in the second phase, and a second cation conduit positioned so as to conduct cations conducted through the separator from the separator to a portion of the photocathode that is spaced apart from the separator. In yet another embodiment of any of the foregoing the photocathode includes a reduction catalyst between the second cation conduit and a side of the photocathode. In yet another embodiment of any of the foregoing the second cation conduit is in direct physical contact with the separator and extends outward from the separator along the lateral side of the photocathode.

The disclosure also provides a solar fuels generator, comprising an ionically conductive separator between a first phase and a second phase; a photocathode that uses cations generated from the first phase to generate the solar fuel in the second phase; and a cation conduit positioned so as to provide a pathway along which cations generated at the photoanode can travel from the separator to the photocathode.

The disclosure also provides a method of generating solar fuels, comprising generating a cation at a photoanode in a gaseous first phase; and conducting the generated cation through a cation conduit to an ionically conducting separator located between the first phase and a second phase.

The disclosure also provides a method of generating fuel comprising contacting the solar generator of the foregoing embodiments with a feedstock selected from the group consisting of gas vapor, a pure water liquid, a gas vapor electrolyte and a liquid electrolyte.

Figure 1:
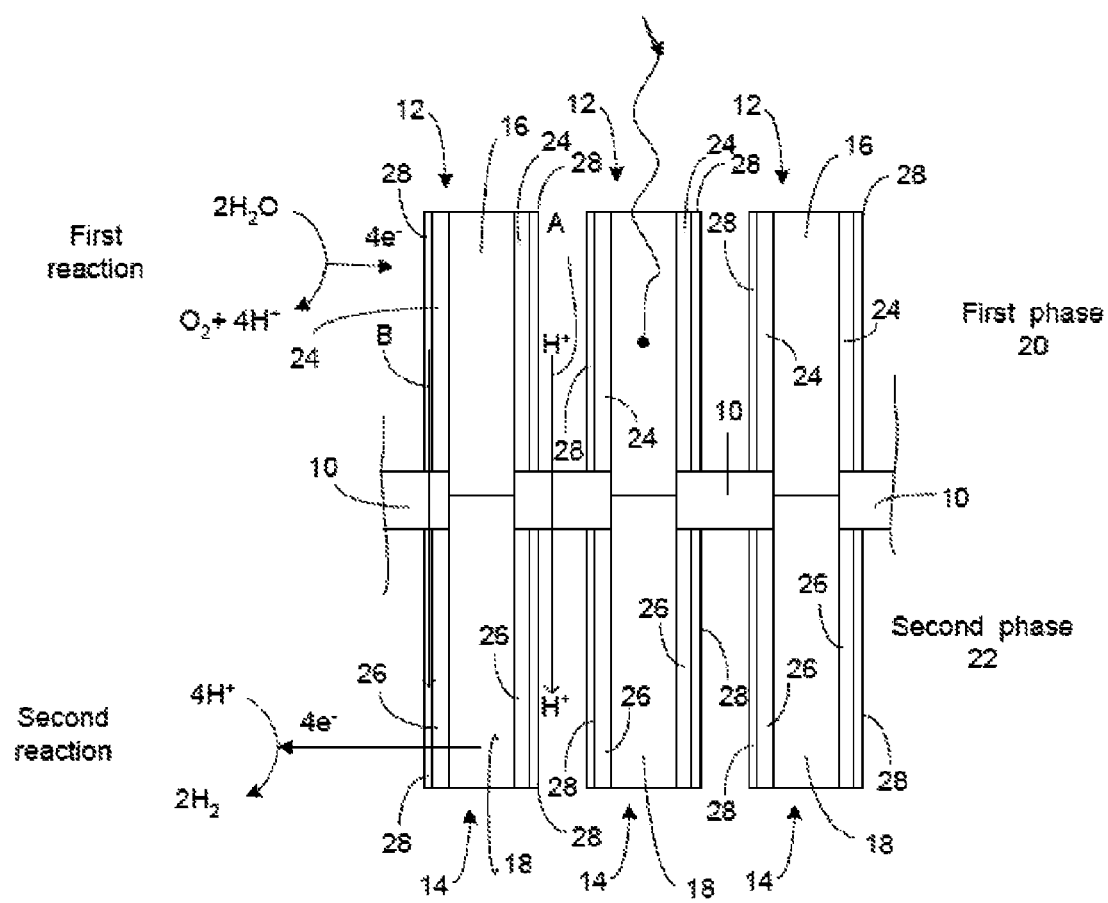
FIG. 1 is a cross section of a solar fuels generator.

In certain figures $H^+$ is depicted as being the cation, however, one will recognize that other anions are applicable depending upon, for example, the feedstock.

DESCRIPTION

As used herein and in the appended claims, the singular forms "a," "and," and "the" include plural referents unless the context clearly dictates otherwise. Thus, for example, reference to "a feedstock" includes a plurality of such feedstocks and reference to "the catalyst" includes reference to one or more catalysts known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

By "about" is meant a quantity, level, value, number, frequency, percentage, dimension, size, amount, weight or length that varies by as much as 30, 25, 20, 25, 10, 9, 8, 7, 6, 5, 4, 3, 2 or 1% to a reference quantity, level, value, number, frequency, percentage, dimension, size, amount, weight or length.

With respect to ranges of values, the invention encompasses each intervening value between the upper and lower limits of the range to at least a tenth of the lower limit's unit, unless the context clearly indicates otherwise. Further, the invention encompasses any other stated intervening values. Moreover, the invention also encompasses ranges excluding either or both of the upper and lower limits of the range, unless specifically excluded from the stated range.

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

The publications discussed above and throughout the text are provided solely for their disclosure prior to the filing date of the present application. Nothing herein is to be construed as an admission that the inventors are not entitled to antedate such disclosure by virtue of prior disclosure.

Prior solar fuels generators use liquid water as the feedstock. One of the difficulties associated with these systems is the generation of gas bubbles such as hydrogen bubbles and oxygen bubbles. The bubbles reduce the contact area between the water and catalysts used by these systems. Further, these bubbles can refract and/or scatter incoming illumination away from the photoelectrodes used in these systems. As a result, the bubbles can reduce the efficiency of the solar fuels generator. This issue can be resolved by switching from a liquid feedstock to a gaseous feedstock. For instance, the feedstock can be a carrier gas that includes water vapor. The water vapor can serve as a reactant in the generation of the solar fuel. In other embodiments, the feedstock can comprise an aqueous electrolyte solution including static aqueous solutions.

Solar fuels generators of the disclosure include components for generating a voltage that is sufficient to drive reactions such water electrolysis reactions. These components typically include light absorbing media that receive light such as sunlight and absorb at least a portion of the received light. The light absorbing media are configured such that the desired voltage level is generated in response to absorption of the received light. The solar fuel generators also include components that use the generated voltage to generate fuels such as hydrogen gas. For instance, the solar fuel generators of the disclosure include catalysts that catalyze a reaction driven by the voltage generated by the power generating components. In many instances the power generating components are integrated with the fuel generating components. For instance, the catalysts can be located between the light absorbing media and the source of light. In prior existing arrangement, the catalyst undesirably reduces the amount of light that reaches the light absorbing media and accordingly reduces the efficiency of the solar fuels generator.

The disclosure provides a solar fuels generator where the power generating components are separated from the fuel generating components. In addition, the disclosure also provides for the use of water vapor; in this embodiment, the power generating components need not be separated from the fuel generating components. The power generating components can be linked together with the fuel generating components to form a barrier between a first phase and a second phase. In this arrangement, both the power generating components and the fuel generating components can each contact both the first phase and the second phase. The first phase can include the feedstock for the solar fuels generator and second phase can include the fuel generated by the solar fuels generator.

As discussed below in certain embodiments the separation of the solar power generating components and the fuel generating components allows the catalysts to be positioned remotely from the light absorbing media. As a result, the catalysts do not reduce the intensity of light received by the light absorbing media. Further, oxidation catalysts can be positioned on opposing sides of a separator from reduction catalysts. During operation of the solar fuels generator, an oxidation reaction occurs at the oxidation catalysts. Products of the oxidation reaction, such as protons, can travel through the separator to the reduction catalyst where they are consumed in a reduction reaction. As a result, the path-length for the oxidation reaction products can be reduced to the thickness of the separator. Accordingly, separating the fuel generating components and the power generating components can reduce mass transport issues and reduce the internal resistance of the solar fuel generator. Additionally, the structure permits the solar fuel generator to be successfully used with gaseous or liquid feedstocks. For instance, the feedstock can be a liquid such as water or an electrolyte. Alternately, the feedstock can be a gas that includes water or can be water vapor. An aqueous electrolyte solution can be made by adding an electrolyte to water in a feedwater tank and introducing the electrolyte solution to the solar fuel generator. Typically, the electrolyte is sodium hydroxide (NaOH) or potassium hydroxide (KOH), but cations such as, but not limited to, lithium ($Li^+$), rubidium ($Rb^+$), potassium ($K^+$), cesium ($Cs^+$), barium ($Ba^{2+}$), strontium ($Sr^{2+}$), calcium ($Ca^{2+}$), sodium ($Na^+$), and magnesium ($Mg^{2+}$), may also be used. A suitable electrolyte solution would be a 1M NaOH solution or 1 M $H_2SO_4$ solution. In both case, the anode would make $O_2$ and cathode would make $H_2$ as the fuel. Those skilled in the relevant art will recognize that other compounds are suitable for generating an electrolyte solution.

The use of water vapor as a reactant in a solar fuels generator is challenging because of the mass transport issues such as whether enough water can be transported to the electrodes in order to effectively produce a solar fuel. However, the disclosure demonstrate that with humidified Ar(g) at 20° C. as a feedstock to an electrolyzer, an electrolysis current density of 10 mA $cm^{-2}$ was sustained at an applied voltage of ~1.6 V and a current density of 20 mA $cm^{-2}$ was observed at an applied voltage of ~1.7 V. Surprisingly, the data show that lower voltages were required to support a particular level of current density when using water vapor in the feedstock than were required liquid water was used as the feedstock. Since the voltage that can be achieved by a solar fuels generator that uses light absorption as the voltage source is around 1.5-2 V, these results indicate that that the solar fuels generator can convert water vapor to a solar fuel using terrestrial solar illumination as the energy source. More particularly, these results show that a solar fuels generator can convert water vapor to a hydrogen gas fuel without using an external power source other than unconcentrated light from the sun.

The solar fuels generator includes a separator between a first phase and a second phase. The solar fuels generator also includes at least two electrodes of which at least one is a photoelectrode. Typically the solar fuels generator will includes one or more photoanodes exposed to the first phase and one or more photocathodes exposed to the second phase. During operation of the solar fuels generator, protons are generated at the photoanodes and then travel through the separator. When the feedstock is a liquid, these protons easily travel from the photoanodes to the separator through the liquid. However, the protons do not readily travel through a gaseous feedstock. As a result, the solar fuels generator employs cation conduits that conduct cations from the photoanodes to the separator. These cation conduits increase the efficiency of a solar fuels generator using a carrier gas that includes water vapor as the feedstock.

FIG. 1 is a cross section of a solar fuels generator. The solar fuels generator includes a separator 10 that separates a first phase 20 from a second phase 22. Electrodes are positioned in the separator 10. For instance, photoanodes 12 and photocathodes 14 extend from opposing sides of the separator 10. Although not shown in FIG. 1, the separator 10 can surround each of the photoanodes 12 and photocathodes 14. The photoanodes and photocathodes convert incident light into excited electron-hole pairs that then drive a chemical reaction The photoanodes 12 include an photoanode light absorber 16 selected to absorb light at a wavelength to which the photoanodes will be exposed during operation of the solar fuels generator. Additionally, the photocathodes include a photocathode light absorber 18 selected to absorb light at a wavelength to which the photocathodes 14 will be exposed during operation of the solar fuels generator.

Suitable materials for the photoanode light absorbers 16 and the photocathode light absorbers 18 include, but are not limited to, semiconductors. In some instances, the photoanode light absorbers 16 include or consist of a semiconductor and/or the photocathode light absorbers 18 include or consist of a semiconductor. The bandgap of the semiconductors included in the photoanode light absorbers 16 can be larger than the bandgap of the semiconductors included in the photocathode light absorbers 18. Suitable semiconductors for the photoanode light absorbers 16 include, but are not limited to, metal oxides, oxynitrides, sulfides, and phosphides that are stable in an oxidizing environment such as $WO_3$, $TiO_2$, and TaON. Suitable semiconductors for the photocathode light absorbers 18 include, but are not limited to, p-type silicon, InP, $Cu_2O$, GaP, and $WSe_2$.

In some instances, the photoanode light absorbers 16 and/or the photocathode light absorbers 18 are doped. The doping can be done to form one or more pn junctions within the photoanode light absorbers 16 and the photocathode light absorbers 18. For instance, the photoanode light absorber 16 can be an n-type semiconductor while the photocathode light absorber 18 can be a p-type semiconductor. A p-n junction can also be present within either the photocathode light absorbers 18 or the photoanode light absorber 16 or both, and is arranged so that electrons flow from cathode to a reduction catalyst (discussed below) and holes flow from the anode to an oxidation catalyst (discussed below). It will be recognized that some photoelectrodes can serve as photocatalysts. For example, some semiconductive materials are photocatalysts themselves and do not need additional catalysts to be functional in the systems of the disclosure.

The dashed lines at the interface of the photoanode light absorber 16 and the photocathode light absorber 18 illustrate an interface between the materials of the photoanode light absorber 16 and the photocathode light absorber 18. However, the photoanode light absorber 16 and the photocathode light absorber 18 can be the same material and/or include the same dopant. As a result, a photoanode light absorber 16 and the interfaced photocathode light absorber 18 can be a continuous block of material. In these instances, the dashed lines shown in FIG. 1 may represent a feature that is not discernable in the solar fuels generator. One example of a material that can serve as both the photoanode light absorber 16 and the photocathode light absorber 18 is p-type silicon, which can function as the absorber on both the photoanode and photocathode sides of the separator 10. In particular type silicon is a candidate for the photocathode material because it is cathodically stable under illumination in acidic aqueous media and in conjunction with various metal catalysts can evolve $H_2$ (g) from $H_2O$.

Other possible choices for the light absorber include semiconductors having wider bandgaps than silicon that are stable in the water vapor medium. Oxide semiconductors are believed to be a possible choice. Some of the light absorbers that can be used as a light absorber include, but are not limited to: tandem structure photoanodes, including tungsten oxide ($WO_3$), bismuth vanadium oxide ($BiVO_4$), tantalu-moxynitride (TaON), and titanium oxide ($TiO_2$); tandem structure photocathodes, including silicon (Si), cuprous oxide ($Cu_2O$), gallium phosphide (GaP), gallium arsenide (GaAs), and indium phosphide (InP); single material electrodes, including strontium titanate ($SrTiO_3$), strontium niobate ($SrNbO_3$), and titanium oxide ($TiO_2$); multijunction photovoltaics, including triple junction amorphous silicon (a-Si), and vertically stacked epitaxially grown III-V semiconductors with tunnel junctions; and series connected photovoltaics, including silicon (Si) cells, gallium arsenide (GaAs) cells, cadmium telluride (CdTe) cells, and Copper Indium Gallium Selenide (CIGS) thin film cells.

The absorption of light by the photocathode light absorber and the photoanode light absorber generates the photovoltage that drive the electrolysis. When semiconductors are used for the photocathode light absorber and the photoanode light absorber, the achievable voltage depends on the choice of semiconductor materials, the associated bandgaps, and doping arrangements as is known in the solar cell arts. Accordingly, the material selections and arrangements can be selected to provide the desired voltage levels. For instance, the tandem and multijunction structures discussed above in which two or more semiconductors in series add their voltages together can be used in order to achieve elevated voltages.

In some instances, the photocathode light absorber 18 and the photoanode light absorber 16 are high aspect ratio structures such as cylinders, wires, or similar shapes with square, rectangular, oval, or irregular cross sections. The aspect ratio is the ratio of the length of the semiconductor: width or diameter of the semiconductor. Narrowing the width of the semiconductors reduces the distance that minority carriers must diffuse radially in order to reach the surface of the semiconductor. Accordingly, a suitable average width for the photocathode light absorbers 18 and/or the photoanode light absorbers 16 can be about the minority-carrier diffusion length of the material. In some instances, the average width for the photocathode light absorbers 18 and/or the photoanode light absorbers 16 is in a range of 100 nm-10 µm.

High aspect ratio structures reduce the charge-carrier flux to the surface of the semiconductor. This reduced flux can reduce the turnover frequency required of any catalysts and can permit the use of more abundant and less active catalysts. Suitable average aspect ratios for the photocathode light absorbers 18 include, but are not limited to, ratios greater than 2:1, or 5:1, and/or less than 50:1, 100:1, or 200:1. Additionally or alternately, suitable average aspect ratios for the photoanode light absorbers 16 include, but are not limited to, ratios greater than 2:1, or 5:1, and/or less than 50:1, 100:1, or 200:1. In one example, the average aspect ratio for the photocathode light absorbers 18 and/or the photoanode light absorbers 16 is in a range of 44:1-70:1. The photoanode light absorbers 16 can have the same average dimensions as the photocathode light absorbers 18 or different average dimensions from the photoanode light absorbers 16. Wire or cylinder shaped photoanode light absorbers 16 and/or the photocathode light absorbers 18 can support the above aspect ratios. The use of high aspect ratio structures is optional.

The separator 10 separates a first phase 20 from a second phase 22. For instance, although not shown, the perimeter of the separator 10 can be clamped between flanges that extend from the side of an enclosure into the interior of the enclosure cell. When the perimeter of the separator 10 is clamped in the flanges, the separator 10 spans the interior of the cell. The first phase 20 can be located in the cell on one side of the separator 10 with the photoanodes 12 in the first phase 20 and the second phase 22 can be located in the cell on the opposing side of the separator 10 with the photocathodes 14 in the second phase 22. The first phase is generally different from the second phase. In some instances, the first phase 20 is a liquid that includes water. In some instances, the first phase 20 is a gas that includes water vapor. The second phase can be a gas or a liquid. In some instances, the first phase 20 is a gas that includes water vapor and the second phase is a gas.

When the first phase is a gas that includes water vapor, a suitable relative humidity for the gas includes relative humidities above 40%, 60% or 70%. Additionally or alternately, when the first phase is a gas that includes water vapor, suitable gas flow rates to each of the photoanodes includes flowrates greater than 0.02 L min$^{-1}$, or 0.05 L min$^{-1}$, or 0.2 L min$^{-1}$. Suitable gasses for use in the first phase include, but are not limited to, Ar, nitrogen, helium, and air. When the second phase is a gas that includes water vapor, in some instances, the second gas has a relative humidity above 40%, 60% or 70%.

The separator 10 is ionically conductive. In some instances, the separator 10 is cationically conductive while concurrently being sufficiently nonconductive to the other components of the first phase and the second phase that the first phase and the second phase remain separated from one another. For instance, in some instances, the separator 10 is cationically conductive and non-conductive or substantially non-conductive to nonionic atoms and/or compounds. In some instances, the separator 10 is cationically conductive while being non-conductive or substantially non-conductive to nonionic atoms and/or nonionic compounds and also to anions. Accordingly, the separator 10 can provide a pathway along which cations can travel from the first phase to the second phase without providing a pathway or a substantial pathway from the first phase to the second phase to one, two, or three entities selected from a group consisting of anions, nonionic atoms or nonionic compounds. In some instances, it may be desirable for the separator 10 to conduct both anions and cations. For instance, when the first phase and/or the second phase has elevated pH levels a separator 10 that conducts both anions and cations may be used. As a result, in some instances, the separator 10 conducts cations and anions but not nonionic atoms or nonionic compounds.

Additionally, the separator 10 should be able to incorporate and support the photoanode light absorbers and the photocathode light absorbers, exchange ions sufficiently to prevent the buildup of a pH gradient, separate the gaseous reaction products sufficiently to prevent them from re-combining, and be sufficiently transparent to the incoming light that the light can be absorbed by both the photoanode light absorbers 16 and the photocathode light absorbers 18; and provide enough structural support to the photoanode light absorbers 16 and the photocathode light absorbers 18 that these structures are sufficiently vertical to provide pathways for the protons to travel to and/or from the separator 10. A suitable separator can be a single layer or material or multiple layers of material. Suitable materials for the separator 10 include, but are not limited to, ionomers and mixtures of ionomers. Ionomers are polymers that include electrically neutral repeating units and ionized repeating units. Suitable ionomers include copolymers of a substituted or unsubstituted alkylene and an acid such as sulfonic acid. In one example, the ionomer is a copolymer of tetrafluoro-ethylene and perfluoro-3,6-dioxa-4-methyl-7-octene-sulfonic acid. An example is represented by the following Formula I:

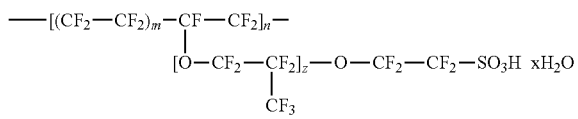

wherein m, n, and z are each greater than 0, or each greater than 1. A suitable material having a structure according to Formula I is sold under the trademark NAFION®. NAFION® is an example of a material that is cationically conductive of cations but is not conductive of anions or nonionic atoms or nonionic compounds. Another suitable separator includes NAFION® functionalized with one or more components selected from a group consisting of dimethylpiperazinium cationic groups, glass frits, asbestos fibers, block copolymer formulated layers, and poly(arylene ether sulfone) with quaternary ammonium groups.

The photoanodes 12 include one or more oxidation catalyst layers 24 that each include or consist of one or more oxidation catalysts. When the feedstock includes water vapor, a suitable oxidation catalyst catalyzes water oxidation. The one or more oxidation catalyst layers 24 can be positioned on the photoanode light absorber 16. In some instances, the one or more oxidation catalyst layers 24 directly contact the photoanode light absorber 16. Additionally or alternately, in some instances, the one or more oxidation catalyst layers 24 coat the photoanode light absorber 16 or are positioned in islands on the photoanode light absorber 16. Suitable oxidation catalysts include, but are not limited to, $IrO_2$, $RuO_2$, $Co_2O_4$, $MnO_2$, $NiFeO_x$ where x is greater than 1 and/or less than 4, $IrRuO_y$ where y is greater than 1 and/or less than 4, NiLaO$_z$ where z is greater than 1 and/or less than 4, BaSrCoFeO$_z$, where z is greater than 1 and/or less than 4, platinum (Pt), and mixtures thereof. One example of a suitable oxidation catalysts is a 1:1 IrO$_2$:RuO$_2$.

The photocathodes 14 include one or more reduction catalyst layers 26 that each includes or consists of one or more reduction catalysts. A suitable reduction catalyst catalyzes the second reaction. For instance, the reduction catalyst can catalyze proton reduction. The one or more reduction catalyst layers 26 can be positioned on the photocathode light absorber 18. In some instances, the one or more reduction catalyst layers 26 directly contact the photocathode light absorber 18. Additionally or alternately, in some instances, the one or more reduction catalyst layers 26 coat the photocathode light absorber 18 or are positioned in islands on the photocathode light absorber 18 as shown in FIG. 1. Suitable reduction catalysts include, but are not limited to, Pt, NiMo, and NiCo.

During operation, the solar fuels generator can be exposed to light such as sunlight, terrestrial solar illumination, AM1 solar radiation, or similar illumination having approximately 1 kilowatt per square meter of incident energy or less. These light sources can be unconcentrated. In some instances, the solar fuels generator is oriented such that the light travels through the photoanodes 12 before reaching the photocathodes 14. Since the photoanode light absorber 16 has a larger bandgap than the photocathode light absorber 18, the photoanodes 12 absorb higher energy (shorter wavelength) light and allow lower energy (longer wavelength) light to pass through the separator 10 to the photocathodes 14. The photocathodes 14 can then absorb the longer wavelengths. Alternately, the light can be incident on both the photoanodes and the photocathodes.

The absorption of light by a photoanode light absorber 16 generates hole-electron pairs within the photoanode light absorber 16. The position of an n-type photoanode light absorber 16 in the first phase 20 produces an electrical field that causes the holes to move to the surface of the photoanode light absorber 16 and then the surface of the oxidation catalyst layer 24 where the oxidation of the water in the first phase 20 is catalyzed. The oxidation of water is labeled reaction 1 in FIG. 1. The electrons move from the photoanode light absorber 16 move toward the photocathode light absorber 18 as a result of the electrical field.

The oxidation of the water generates gaseous oxygen and hydrogen cations (H$^+$, called protons below). As noted above, the separator 10 is cationically conductive. As a result, the protons can travel through the separator 10 and enter the second phase 22 in response to the pH gradient resulting from the generation of protons in the first phase 20. The movement of the protons from the first phase 20 into the second phase 22 is shown by the arrow labeled A in FIG. 1.

The absorption of light by the photocathode light absorber 18 generates hole-electron pairs within the photocathode light absorber 18. The presence of a p-type photocathode light absorber 18 in the second phase 22 produces an electrical field that causes the electrons within the photocathode light absorber 18 to move to the surface of the photocathode light absorber 18 and then the surface of the reduction catalyst layer 26 where they react with the protons to form hydrogen gas. The reduction of the protons is labeled reaction 2 in FIG. 1. The resulting hydrogen gas can be stored for use as hydrogen fuel. The holes generated in the photocathode light absorber 18 by the absorption of light move from the photocathode light absorber 18 toward the photoanode light absorber 16 as a result of the electrical field and can recombine with the electrons from the photoanode light absorber 16.

Cation conduits 28 are located on the photoanode light absorbers 16 and/or the photocathode light absorbers 18. For instance, the cation conduits 28 are positioned such that a line perpendicular to lateral surfaces of the photoanode light absorbers 16 and/or the photocathode light absorber 18 passes through the cation conduits. In some instances, the cation conduits 28 are located such that the oxidation catalyst layer 24 is located between the cation conduit 28 and the photoanode light absorber 16 as shown in FIG. 1 and such that a line perpendicular to lateral surfaces of the photoanode light absorbers 16 passes through the oxidation catalyst layer 24 and also at least one cation conduit 28. When the oxidation catalyst layer 24 is located between the cation conduit 28 and the photoanode light absorber 16, the cation conduit 28 can be in direct physical contact with the oxidation catalyst layer 24 or other materials can be located between the cation conduit 28 and the oxidation catalyst layer 24. Additionally or alternately, the cation conduits 28 can be located such that the reduction catalyst layer 26 is located between the cation conduit 28 and the photocathode light absorber 16 and such that a line perpendicular to lateral surfaces of the photocathode light absorbers 18 passes through the reduction catalyst layer 26 and also at least one cation conduit 28. When the reduction catalyst layer 26 is located between the cation conduit 28 and the photocathode light absorber 18, the cation conduit 28 can be in direct physical contact with the reduction catalyst layer 26 or other materials can be located between the cation conduit 28 and the reduction catalyst layer 26.

The cation conduits 28 are ionically conductive. In some instances, the cation conduits 28 are cationically conductive while being non-conductive or substantially non-conductive to one, two, or three entities selected from a group consisting of anions, nonionic atoms or nonionic compounds.

The cation conduits 28 can be in direct physical contact with the separator 10. Since the separator 10 and the cation conduits 28 are both cationically conductive, the contact between the cation conduits 28 and the separator 10 provides a pathway that cations can travel from the photoanode 12 side of the separator 10 to the photocathode 14 side of the separator 10. For instance, the arrow labeled B in FIG. 1 shows the movement of the protons from the photoanode 12 side of the separator 10 to the photocathode 14 side of the separator 10. When the first phase is a gas phase, the protons resulting from the first reaction do not readily travel through the first phase to the separator 10. More particularly, the protons do not readily travel from the oxidation catalyst to the separator 10 through the first phase. The cation conduits 28 make up for this deficiency by providing an efficient pathway from photoanodes to the separator 10 and then into the second phase. More particularly, when the cation conduits contact the oxidation catalyst layer and the separator 10, the cation conduits provide a pathway that the protons can travel from the oxidation catalyst layer to the separator 10. As a result, when the first phase is a gas, the dominant pathway that the protons travel from the from the photoanode 12 side of the separator 10 to the photocathode 14 side of the separator 10 may be the pathway indicated by the arrow labeled B rather than the arrow labeled A.

When the second phase is a gas phase, the protons resulting from the first reaction do not readily travel from the separator 10 to the photocathodes through the second phase. More particularly, the protons do not readily travel from the separator 10 to the reduction catalyst through the second phase. The cation conduits 28 make up for this deficiency by providing an efficient pathway from separator 10 to the photocathodes. More particularly, when the cation conduits contact the reduction catalyst layer and the separator 10, the cation conduits provide a pathway that the protons can travel from separator to the reduction catalyst layer.

The cation conduits 28 can include one or more layers or material. The material for the cation conduits 28 on the photoanode side of the separator 10 and the material for the cation conduits 28 on the photocathode side of the separator 10 can be the same or different. In some instances, material for the cation conduits 28 on the photoanode side of the separator 10 and the material for the cation conduits 28 on the photocathode side of the separator 10 are the same material as the separator 10. Further, the cation conduits 28 can be continuous with the separator 10 in that there is not an interface between the cation conduits 28 and the separator 10.

The cation conduits 28 can be a solid or can be included in a layer that is a solid. A suitable material for the cation conduits 28 includes, but is not limited to, ionomers and mixtures of ionomers as described above.

As noted above, the cation conduits 28 and the separator 10 can be constructed of the same material and can optionally be continuous with the separator 10. However, even when cation conduits 28 and the separator 10 are constructed of the same material, the cation conduits 28 and the separator 10 can have a different thickness. In some instances, all or a portion of the cation conduits 28 are thin enough that a reactant can diffuse through the cation conduit 28 to the underlying catalyst. For instance, the cation conduits 28 on the photoanode side of the separator 10 can be thin enough to permit the water from water vapor or liquid water to diffuse through the cation conduit 28 to the underlying catalyst. This diffusion of water through the cation conduit 28 allows the first reaction shown in FIG. 1 to occur at a surface of the oxidation catalyst layer 24. In contrast, the separator 10 can be thick enough to support the photoanode light absorbers and/or the photocathode light absorbers such that the far end of each light absorber is held above the separator 10. Increasing the portion of the light absorber embedded in the separator 10 can increase the support of the light absorber. However, it is possible that increasing the portion of the semiconductor in the separator 10 can increase the portion of light that is absorbed by the separator 10 rather than by the light absorbers. A suitable average percentage of the photoanode light absorber length and/or photocathode light absorber length that is inside of the separator 10 includes percentages greater than 5%, or 20% and/or less than 80%, or 100%. As a result, the separator 10 may be thicker than the cation conduits 28. For instance, a ratio for a thickness of the separator 10 to a thickness of one or more of the cation conduits can be greater than 5:1, 50:1, or 100:1.

Although FIG. 1 illustrates the cation conduits 28 extending from the separator 10 and then up the entire length of the photoanode light absorbers 16 and the photocathode light absorbers 18, the cation conduits 28 can extend only part way up the length of the photoanode light absorbers 16 and/or the photocathode light absorbers 18. For instance, the cation conduits 28 can extend more than 10%, 30% or 50% and/or less 70% or 90% up the length of the photoanode light absorbers 16 and/or the photocathode light absorbers 18.

Although the solar fuels generators of FIG. 1 illustrate the cation conduits 28 as a layer of material over the oxidation catalyst layer 24 or the reduction catalyst layer 26, the oxidation catalyst layer 24 or the combination of the oxidation catalyst layer 24 and the touching cation conduit 28 can be a layer where the oxidation catalyst is dispersed through the cation conduit 28. As an example, the oxidation catalyst layer 24 can be a layer where one or more oxidation catalysts or particles of the one or more oxidation catalysts are coated with the cation conduit 28. Additionally or alternately, the layer represented by the reduction catalyst layer 26 or the combination of layers represented by the reduction catalyst layer 26 and touching conduit 28 can be a layer where the one or more reductions catalysts are dispersed through the cation conduit 28. As an example, the reduction catalyst layer 26 can be a layer where the one or more reduction catalysts or particles of the one or more reduction catalysts are coated with the cation conduit 28. In these arrangements, the cation conduit 28 provides a pathway along which the cations can travel through the layer that includes the reduction catalyst layer and also through the layer that includes the oxidation catalyst. For instance, the line labeled B can illustrate the path of the protons from the first phase to the second phase. As a result, these embodiments of the solar fuels generator can operate as disclosed in the context of FIG. 1.

The design set forth in FIG. 1 is useful for using feedstocks including, but not limited to gas vapors such as water vapor and other aqueous vapor feedstocks (e.g., electrolyte containing vapors) as well as static liquids (e.g., water and electrolyte containing aqueous solutions).

Figure 2:
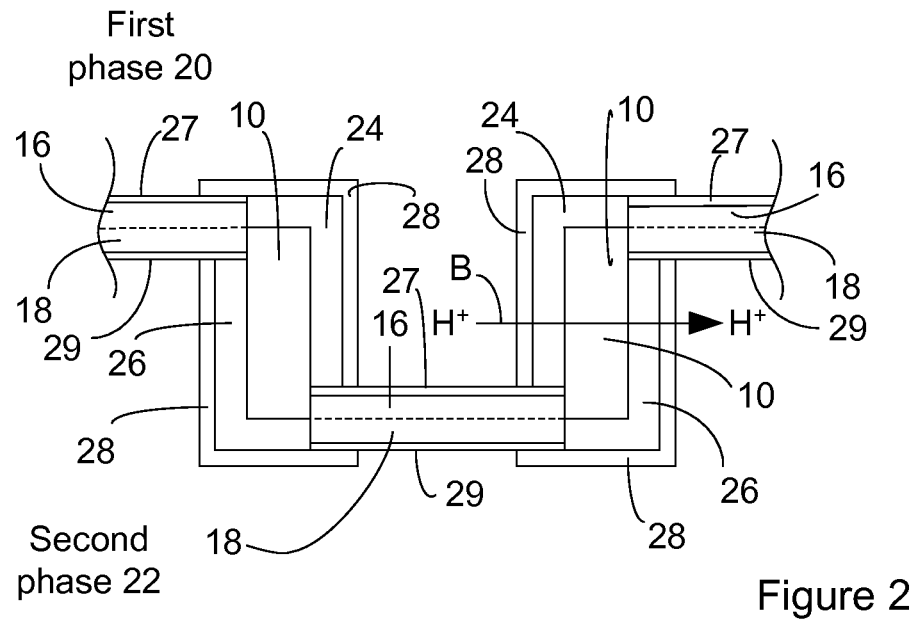
FIG. 2 is a cross section of another embodiment of a solar fuels generator.
Figure 3A:
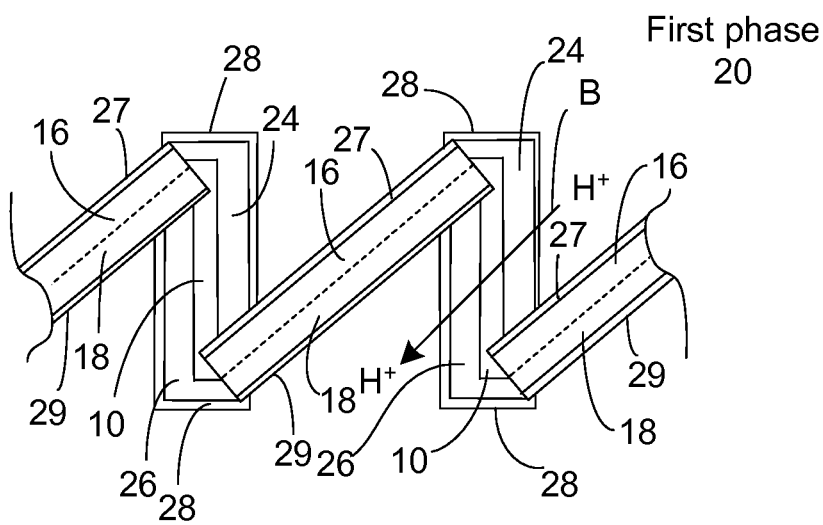
FIG. 3A is a cross section of another embodiment of a solar fuels generator.

The components of FIG. 1 can be re-arranged to achieve other solar fuels generators as shown in FIG. 2 and FIG. 3A. The photoanodes 12 each include an anode electrical conductor 27 in electrical communication with the photoanode light absorber 16. The anode electrical conductor 27 is also in electrical communication with the oxidation catalyst layer 24. For instance, the anode electrical conductor 27 can be in electrical communication with the oxidation catalyst layer 24 itself and/or with electrically conducting components within the oxidation catalyst layer 24. For instance, the anode electrical conductor 27 can be in electrical communication with a metal mesh, metal substrate, or current collector included in the oxidation catalyst layer 24. As a result, the anode electrical conductor 27 provides electrical communication between the photoanode light absorber 16 and the oxidation catalyst layer 24. Accordingly, the anode electrical conductor 27 provides a pathway for holes to travel from the photoanode light absorber 16 to the oxidation catalyst layer 24.

The anode electrical conductor 27 can be in direct physical contact with the photoanode light absorber 16. The anode electrical conductor 27 is positioned on a surface of the photoanode light absorber 16 such that a line that is perpendicular to the surface extends from the surface through the anode electrical conductor 27 before extending into the first phase. The anode electrical conductor 27 can be positioned such that the anode electrical conductor 27 is on more than 10%, 30%, 50%, 75%, or 90% of the surface of the photoanode light absorber 16.

The anode electrical conductor 27 can be optically transparent in order to permit incident light to reach the underlying photoanode light absorber 16. Suitable materials for the anode electrical conductor 27 include, but are not limited to, transparent metals, transparent conductive oxides, and transparent conductive polymer films. In some instances, the anode electrical conductor 27 is a degeneratively doped region of the photoanode light absorber 16.

The photocathodes 14 each include a cathode electrical conductor 29 in electrical communication with the photocathode light absorber 18. The cathode electrical conductor 29 is also in electrical communication with the one or more reduction catalyst layers 26. For instance, the cathode electrical conductor 29 can be in electrical communication with a reduction catalyst layer 26 itself and/or with electrically conducting components within the reduction catalyst layer 26. For instance, the cathode electrical conductor 29 can be in electrical communication with a metal mesh, metal substrate, or current collector included in a reduction catalyst layer 26. As a result, the cathode electrical conductor 29 provides electrical communication between the photocathode light absorber 18 and a reduction catalyst layer 26. Accordingly, the cathode electrical conductor 29 provides a pathway for electrons to travel from the photoanode light absorber 16 to the reduction catalyst layer 26.

The cathode electrical conductor 29 can be in direct physical contact with the photocathode light absorber 18. The cathode electrical conductor 29 is positioned on a surface of the photocathode light absorber 18 such that a line that is perpendicular to the surface extends from the surface through the cathode electrical conductor 29 before extending into the first phase. The cathode electrical conductor 29 can be positioned such that the cathode electrical conductor 29 is on more than 10%, 30%, 50%, 75%, or 90% of the surface of the photoanode light absorber 16.

The cathode electrical conductor 29 can be optically transparent, reflective, optically opaque or optically black. Suitable materials for the cathode electrical conductor 29 include, but are not limited to, metals, conductive polymer films and carbon nanotubes. In some instances, the cathode electrical conductor 29 is a degeneratively doped region of the photocathode light absorber 18.

Suitable transparent metals for use as the anode electrical conductor 27 and/or as the cathode electrical conductor 29 include, but are not limited to, silver metal nanowires or networks, gold metal nanowires or networks and carbon nanotube networks. Suitable transparent conductive oxides for use as the anode electrical conductor 27 and/or as the cathode electrical conductor 29 include, but are not limited to, fluorine doped tin oxide, indium doped tin oxide, and aluminum doped zinc oxide. Suitable transparent conductive polymer films for use as the anode electrical conductor 27 and/or as the cathode electrical conductor 29 include, but are not limited to, poly(3,4-ethlenedioxythiophene) (PEDOT), poly(3,4-ethylenedioxythiphene) PEDOT: poly(styrene sulfonate) PSS.

The solar fuels generators of FIG. 1 through FIG. 3A illustrate the cation conduits 28 as a layer of material over the oxidation catalyst layer 24 or the reduction catalyst layer 26. However, the oxidation catalyst layer 24 or the combination of layers represented by the oxidation catalyst layer 24 and the touching cation conduit 28 can be a single layer where the oxidation catalyst is dispersed through the cation conduit 28. As an example, the oxidation catalyst layer 24 or the layers represented by the oxidation catalyst layer 24 and the touching cation conduit 28 can be a single layer where the oxidation catalyst or particles of the oxidation catalyst are coated with the cation conduit 28. Further, the reduction catalyst layer 26 or the combination of layers represented by the reduction catalyst layer 26 and touching conduit 28 can be combined into a single layer where the one or more reduction catalysts are dispersed through the cation conduit 28. As an example, the layer represented by the reduction catalyst layer 26 or the layers represented by the reduction catalyst layer 26 and the touching cation conduit 28 can be a single layer where the one or more reduction catalysts or particles of the one or more reduction catalyst are coated with the cation conduit 28. In the solar fuels generators of FIG. 2 and FIG. 3A, when these material arrangements are used, the presence of cation conduit 28 in the oxidation catalyst layer and/or in the layer of reduction catalyst layer provides a pathway along which the cations can travel through the layer that includes the one or more reduction catalysts and also through the layer that includes the one or more oxidation catalysts. For instance, the line labeled B in FIG. 2 and FIG. 3A can illustrate the path of the protons from the first phase to the second phase. As a result, these embodiments of the solar fuels generator can operate as disclosed in the context of FIG. 1. A suitable method for coating a catalyst with a cation conductor includes, but is not limited to, casting the catalyst in a liquid solution containing the ionomer and later processing that ionomer to an active membrane form.

The oxidation catalyst layer 24 and/or reduction catalyst layer 26 can include materials in addition to the catalyst. For instance, the above oxidation catalyst layer 24, layers that include oxidation catalyst and cation conduit 28, reduction catalyst layer 26, and layers that include reduction catalyst and cation conduit 28 can include one or more components selected from a group consisting of electrically conductive fillers, electrically conductive materials, diluents, and/or binders. For instance, a layer can include a metal mesh or metal substrate that provides support to the catalyst and/or cation conduit and/or enhances the electrical conductivity of the catalyst and/or cation conduit. In some instances, the metal mesh or substrate acts as a current collector. A suitable method for forming a layer that includes an electrically conducting mesh or substrate, a catalyst and optionally a cation conduit includes hot pressing a mesh to a membrane and casting catalyst particles on the metal mesh from a solution of the membrane ionomer material.

A suitable method of forming the separator 10 on the anode light absorbers and the cathode light absorbers includes, but is not limited to, solution casting an ionomer material onto the semiconductor. A suitable method for applying an oxidation catalyst to the anode light absorbers includes, but is not limited to, electrodeposition, sputtering, electroless deposition, spray pyrolysis, atomic layer deposition, etc. A suitable method for applying a reduction catalyst to the anode light absorbers includes, but is not limited to, electrodeposition, sputtering, electroless deposition, spray pyrolysis, atomic layer deposition, etc. A suitable method for forming the cation conduit on the one or more reduction catalyst layers and/or the one or more oxidation catalyst layers includes, but is not limited to, solution casting the ionomer material onto the one or more reduction catalyst layers and/or the one or more oxidation catalyst layers. A suitable method for forming an anode electrical conductor on a photoanode includes, but is not limited to, spin coating, physical vapor deposition, spray pyrolysis, atomic layer deposition, electrodeposition and electroless deposition. A suitable method for forming a cathode electrical conductor on a photocathode includes, but is not limited to, spin coating, physical vapor deposition, spray pyrolysis, atomic layer deposition, electrodeposition and electroless deposition.

Figure 3B:
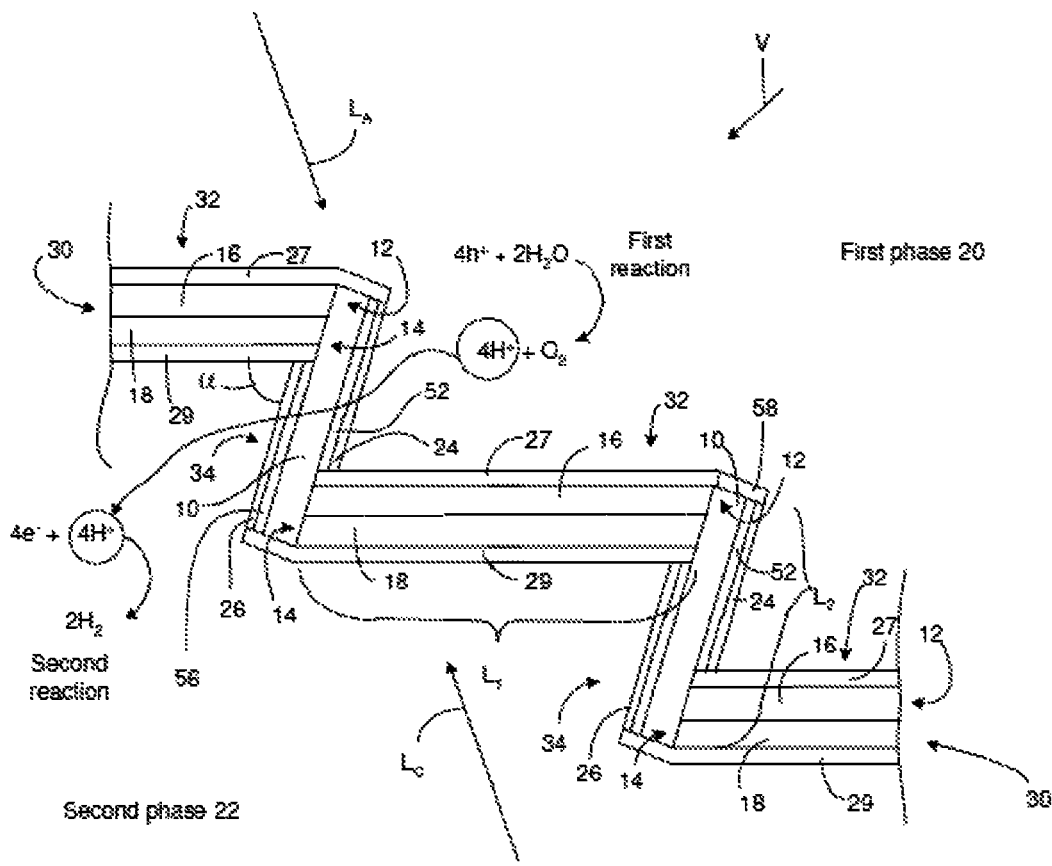
FIG. 3B is a cross section of a solar fuels generator.
Figure 3C:
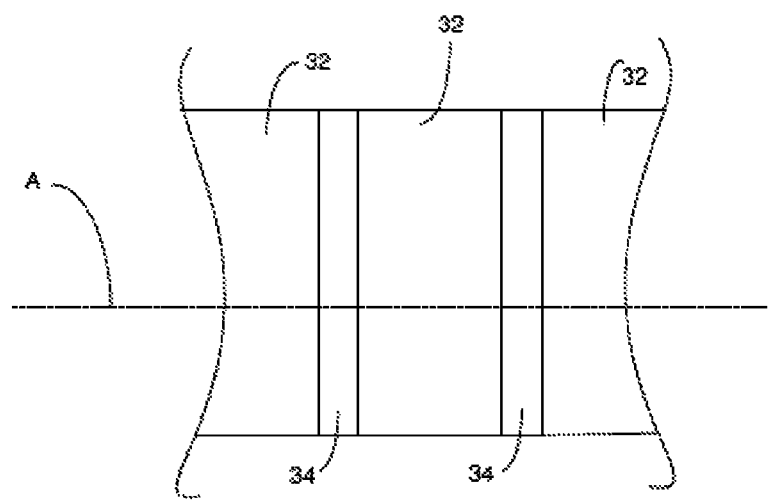
FIG. 3C is a sideview of the solar fuels generator shown in FIG. 3B taken looking in the direction of the arrow labeled V in FIG. 3B.

FIG. 3B is a cross section of a solar fuels generator. FIG. 3C is a sideview of the solar fuels generator shown in FIG. 3B taken looking in the direction of the arrow labeled V in FIG. 3B. The cross section shown in FIG. 3B can be taken along the line labeled A in FIG. 3C.

The solar fuels generator includes a barrier 30 between a first phase 20 and a second phase 22. The barrier 30 includes or consists of one or more power generating components 32 and one or more fuel generating components 34. FIG. 3B illustrates power generating components 32 linked end-to-end with fuel generating components 34 so as to form the barrier 30 between the first phase 20 and the second phase 22. The power generating components 32 are alternated with the fuel generating components 34. The power generating components 32 each contacts both the first phase 20 and the second phase 22 and the fuel generating components 34 each contacts both the first phase 20 and the second phase 22. The barrier 30 is formed such that the first phase 20 can be maintained at a different chemical composition than the second phase 22. For instance, the barrier 30 can be impermeable or substantially impermeable to nonionic atoms and/or nonionic compounds.

The power generating components 32 include photoanodes 12 and photocathodes 14. As illustrated by the arrow labeled $L_A$ and $L_C$, light is incident on the photoanodes 12 and/or photocathodes 14 during operation of the solar fuels generator. The photoanodes 12 and photocathodes 14 convert the received light into excited electron-hole pairs that drive a chemical reaction such as electrolysis of water or an electrolyte solution. The photoanodes 12 include a photoanode light absorber 16 selected to absorb light at a wavelength to which the photoanodes 12 will be exposed during operation of the solar fuels generator. Additionally, the photocathodes 14 include a photocathode light absorber 18 selected to absorb light at a wavelength to which the photocathodes will be exposed during operation of the solar fuels generator.

The photoanodes 12 each include an anode electrical conductor 27 in electrical communication with the photoanode light absorber 16. The anode electrical conductor 27 can be in direct physical contact with the photoanode light absorber 16. The anode electrical conductor 27 is positioned on a surface of the photoanode light absorber 16 such that a line that is perpendicular to the surface extends from the surface through the anode electrical conductor 27 before extending into the first phase. The anode electrical conductor 27 can be positioned such that the anode electrical conductor 27 is on more than 10%, 30%, 50%, 75%, or 90% of the surface of the photoanode light absorber 16.

The anode electrical conductor 27 can be optically transparent in order to permit incident light to reach the underlying photoanode light absorber 16. Suitable materials for the anode electrical conductor 27 include, but are not limited to, transparent metals, transparent conductive oxides, transparent conductive polymer films. In some instances, the anode electrical conductor 27 is a degeneratively doped region of the photoanode light absorber 16.

The photocathodes 14 each include a cathode electrical conductor 29 in electrical communication with the photocathode light absorber 18. For instance, the cathode electrical conductor 29 can be in direct physical contact with the photocathode light absorber 18. The cathode electrical conductor 29 is positioned on a surface of the photocathode light absorber 18 such that a line that is perpendicular to the surface extends from the surface through the cathode electrical conductor 29 before extending into the first phase. The cathode electrical conductor 29 can be positioned such that the cathode electrical conductor 29 is on more than 10%, 30%, 50%, 75%, or 90% of the surface of the photoanode light absorber 16.

The cathode electrical conductor 29 can be optically transparent, reflective, optically opaque or optically black. Suitable materials for the cathode electrical conductor 29 include, but are not limited to, metals, conductive polymer films and carbon nanotubes. In some instances, the cathode electrical conductor 29 is a degeneratively doped region of the photocathode light absorber 18.

Suitable transparent metals for use as the anode electrical conductor 27 and/or as the cathode electrical conductor 29 include, but are not limited to, silver metal nanowires or networks, gold metal nanowires or networks and carbon nanotube networks. Suitable transparent conductive oxides for use as the anode electrical conductor 27 and/or as the cathode electrical conductor 29 include, but are not limited to, fluorine doped tin oxide, indium doped tin oxide, aluminum doped zinc oxide. Suitable transparent conductive polymer films for use as the anode electrical conductor 27 and/or as the cathode electrical conductor 29 include, but are not limited to, poly(3,4-ethlenedioxythiophene) (PEDOT), poly(3,4-ethylenedioxythiphene) PEDOT: poly(styrene sulfonate) PSS.

Suitable materials for the photoanode light absorbers 16 and the photocathode light absorbers 18 include, but are not limited to, semiconductors. In some instances, the photoanode light absorbers 16 include or consist of a semiconductor and/or the photocathode light absorbers 18 include or consist of a semiconductor. The bandgap of the semiconductors included in the photoanode light absorbers 16 can be larger than the bandgap of the semiconductors included in the photocathode light absorbers 18. Suitable semiconductors for the photoanode light absorbers 16 include, but are not limited to, metal oxides, oxynitrides, sulfides, and phosphides such as $WO_3$, $TiO_2$, and TaON. Suitable semiconductors for the photocathode light absorbers 18 include, but are not limited to, p-type silicon, InP, $Cu_2O$, GaP, and $WSe_2$.

In some instances, the photoanode light absorbers 16 and/or the photocathode light absorbers 18 are doped. The doping can be done to form one or more pn junctions within the photoanode light absorbers 16 and the photocathode light absorbers 18. For instance, the photoanode light absorber 16 can be an n-type semiconductor while the photocathode light absorber 18 can be a p-type semiconductor. A pn junction can also be present within either the photocathode light absorbers 18 or the photoanode light absorber 16 or both, and is arranged so that holes flow from the photoanode light absorber 16 to the anode electrical conductor 27 and electrons flow from the photocathode light absorbers 18 to the cathode electrical conductor 29.

The dashed lines at the interface of the photoanode light absorber 16 and the photocathode light absorber 18 illustrate an interface between the materials of the photoanode light absorber 16 and the photocathode light absorber 18. However, the photoanode light absorber 16 and the photocathode light absorber 18 can be the same material and/or include the same dopant. As a result, a photoanode light absorber 16 and the interfaced photocathode light absorber 18 can be a continuous block of material. In these instances, the dashed lines shown in FIG. 3B may represent a feature that is not discernable in the solar fuels generator. One example of a material that can serve as both the photoanode light absorber 16 and the photocathode light absorber 18 is p-type silicon, which can function as the absorber on both the oxidation and reduction sides of the separator 10. In particular, p-type silicon is a candidate for the photocathode material because it is cathodically stable under illumination in acidic aqueous media and in conjunction with various metal catalysts can evolve $H_2$ (g) from $H_2O$.

Other possible choices for the light photoanode light absorber 16 and/or the photocathode light absorber 18 include semiconductors having wider bandgaps than silicon that are stable in a water vapor medium such as oxide semiconductors. Some of the oxide semiconductors that can be used as a light absorber include, but are not limited to: tandem structure photoanodes, including tungsten oxide ($WO_3$), bismuth vanadium oxide ($BiVO_4$), tantalumoxynitride (TaON), and titanium oxide ($TiO_2$); tandem structure photocathodes, including silicon (Si), cuprous oxide ($Cu_2O$), gallium phosphide (GaP), gallium arsenide (GaAs), and indium phosphide (InP); single material electrodes, including strontium titanate ($SrTiO_3$), strontium niobate ($SrNbO_3$), and titanium oxide ($TiO_2$); multifunction photovoltaics, including triple junction amorphous silicon (a-Si), and vertically stacked epitaxially grown III-V semiconductors with tunnel junctions; and series connected photovoltaics, including silicon (Si) cells, gallium arsenide (GaAs) cells, cadmium telluride (CdTe) cells, and Copper Indium Gallium Selenide (CIGS) thin film cells.

The absorption of light by the photocathode light absorber 18 and the photoanode light absorber 16 generates the photovoltage that drive a reaction such as water electrolysis. When semiconductors are used for the photocathode light absorber 18 and the photoanode light absorber 16, the achievable voltage depends on the choice of semiconductor materials, the associated bandgaps, and doping arrangements as is known in the solar cell arts. Accordingly, the material selections and arrangements can be selected to provide the desired voltage levels. For instance, the tandem and multijunction structures discussed above in which two or more semiconductors in series add their voltages together can be used in order to achieve elevated voltages.

The fuel generating components 34 include a separator 10 located between the first phase 20 and the second phase 22. The first phase 20 is generally different from the second phase 22. In some instances, the first phase 20 is a liquid that includes water and/or an electrolyte. In some instances, the first phase 20 is a gas that includes water vapor. The second phase 22 can be a gas or a liquid. In some instances, the second phase 22 is a liquid that includes water and/or an electrolyte. In one example, the first phase 20 is a gas that includes water vapor and the second phase 22 is a gas.

When the first phase 20 is a gas that includes water vapor, a suitable relative humidity for the gas includes relative humidities above 40%, 60% or 70%. Additionally or alternately, when the first phase 20 is a gas that includes water vapor, suitable gas flow rates to each of the photoanodes includes flowrates greater than 0.02 L $min^{-1}$, or 0.05 L $min^{-1}$, or 0.2 L $min^{-1}$. Suitable gasses for use in the first phase 20 include, but are not limited to, Ar, nitrogen, helium, and air. When the second phase 22 is a gas that includes water vapor, in some instances, the second gas has a relative humidity above 40%, 60% or 70%.

The separator 10 is ionically conductive. In some instances, the separator 10 is cationically conductive while concurrently being sufficiently nonconductive to the other components of the first phase 20 and the second phase 22 that the first phase 20 and the second phase 22 remain separated from one another. For instance, in some instances, the separator 10 is cationically conductive and non-conductive or substantially non-conductive to nonionic atoms and/or nonionic compounds. In some instances, the separator 10 is cationically conductive while being non-conductive or substantially non-conductive to nonionic atoms and/or nonionic compounds and also to anions. Accordingly, the separator 10 can provide a pathway along which cations can travel from the first phase 20 to the second phase 22 without providing a pathway or a substantial pathway to the first phase 20 to the second phase 22 to one, two, or three entities selected from a group consisting of anions, nonionic atoms or nonionic compounds. In some instances, it may be desirable for the separator 10 to conduct both anions and cations. For instance, when the first phase 20 and/or the second phase 22 has elevated pH levels a separator 10 that conducts both anions and cations may be used. As a result, in some instances, the separator 10 conducts cations and anions but not nonionic atoms or nonionic compounds.

Additionally, the separator 10 should be able to exchange ions sufficiently to prevent the buildup of a pH gradient, and separate the reaction products sufficiently to prevent them from re-combining. A suitable separator 10 can be a single layer or material or multiple layers of material. Suitable materials for the separator 10 include, but are not limited to, ionomers and mixtures of ionomers as described above and elsewhere herein. Another suitable separator 10 includes NAFION® functionalized with one or more components selected from a group consisting of dimethylpiperazinium cationic groups, glass frits, asbestos fibers, block copolymer formulated layers, and poly(arylene ether sulfone) with quaternary ammonium groups.

The fuel generating components 34 include one or more oxidation catalyst layers 24 that each include or consist of one or more oxidation catalysts. When the feedstock includes water or water vapor, a suitable oxidation catalyst catalyzes water oxidation. In some instances, the one or more oxidation catalyst layers 24 do not contact the photoanode light absorber 16 as is shown in FIG. 3B. Suitable oxidation catalysts are described above (e.g., one example of a suitable oxidation catalyst is a 1:1 $IrO_2$:$RuO_2$). The oxidation catalyst layer 24 is positioned on a surface of the separator 10 such that a line that is perpendicular to the surface extends from the surface through the oxidation catalyst layer 24 before extending through the first phase 20. The one or more oxidation catalyst layers 24 can be positioned such that the one or more oxidation catalyst layers 24 are on more than 100%, 500%, or 1000% of the separator 10 surface.

The fuel generating components 34 include an oxidation electrical conductor 52 in electrical communication with the one or more oxidation catalyst layers 24. Additionally, the oxidation electrical conductor 52 is in electrical communication with the anode electrical conductor 27. As noted above, the anode electrical conductor 27 is in electrical communication with the photoanode light absorber 16. As a result, the oxidation electrical conductor 52 and the anode electrical conductor 27 are included in an anode electrical conduit that provides electrical communication between the one or more oxidation catalyst layers 24 and the photoanode light absorber 16. Suitable oxidation electrical conductors 52 include, but are not limited to, conductors through which protons can travel. For instance, the oxidation electrical conductor 52 can be a porous material such as a metal mesh, a mat of metal nanowires or a layer that includes or consists of metal nanowires, conductive carbon cloth, mats of carbon fibers or a layer that includes or consists of carbon fibers, and mat of carbon nanotubes or a layer that includes or consists of carbon nanotubes.

The fuel generating components 34 include one or more reduction catalyst layers 26 that each includes or consists of one or more reduction catalysts. The one or more reduction catalyst layers 26 are on an opposite side of the separator 10 from the one or more oxidation catalyst layers 24. The separator 10 can electrically insulate the one or more reduction catalyst layers 26 from the one or more oxidation catalyst layers 24. In some instances, the one or more reduction catalyst layers 26 do not contact the photocathode light absorber 18 as is shown in FIG. 3B. When the feedstock includes water or water vapor, a suitable reduction catalyst catalyzes proton reduction. Suitable reduction catalysts include are described above. The one or more reduction catalyst layers 26 are positioned on a surface of the separator 10 such that a line that is perpendicular to the surface extends from the surface through one or more of the reduction catalyst layers 26 before extending through the second phase 22. The one or more reduction catalyst layers can be positioned such that the one or more reduction catalyst layers are on more than 100%, 500%, or 1000% of the separator 10 surface.

The fuel generating components 34 include a reduction electrical conductor 56 in electrical communication with the one or more reduction catalyst layers 26. Additionally, the reduction electrical conductor 56 is in electrical communication with the cathode electrical conductor 29. As noted above, the cathode electrical conductor 29 is in electrical communication with the photocathode light absorber 18. As a result, the reduction electrical conductor 56 and the cathode electrical conductor 29 are included in an anode electrical conduit that provides electrical communication between the one or more reduction catalyst layers 26 and the photocathode light absorber 18. Suitable reduction electrical conductors 56 include, but are not limited to, conductors through which protons can travel. For instance, the reduction electrical conductor 56 can be a porous material such as a metal mesh, a mat of metal nanowires or a layer that includes or consists of metal nanowires, conductive carbon cloth, mats of carbon fibers or a layer that includes or consists of carbon fibers, and mat of carbon nanotubes or a layer that includes or consists of carbon nanotubes.

During operation, the solar fuels generator is exposed to light such as sunlight, terrestrial solar illumination, AM1 solar radiation, or similar illumination having approximately 1 kilowatt per square meter of incident energy or less. These light sources can be unconcentrated or can be concentrated using known light concentration devices and techniques. In some instances, the solar fuels generator is oriented such that the light travels through the photoanodes before reaching the photocathodes. When the photoanode light absorber 16 has a larger bandgap than the photocathode light absorber 18, the photoanodes absorb higher energy (shorter wavelength) light and allow lower energy (longer wavelength) light to pass through to the photocathodes. The photocathodes can then absorb the longer wavelengths. Alternately, the light can be incident on both the photoanodes and the photocathodes or can be incident on the photocathodes before reaching the photoanodes.

The absorption of light by a photoanode light absorber 16 generates hole-electron pairs within the photoanode light absorber 16. The presence of an n-type photoanode light absorber 16 in the first phase 20 produces an electrical field that causes the holes to flow from the photoanode light absorber 16 to the anode electrical conductor 27. The holes can then flow through the oxidation electrical conductor 52 to the one or more oxidation catalyst layers 24 where oxidation of water in the first phase 20 is catalyzed.

The oxidation of water is labeled reaction 1 in FIG. 3B. The oxidation of the water generates gaseous oxygen and protons. As noted above, the separator 10 is cationically conductive. As a result, the protons move from the oxidation catalyst layer 24 to the reduction catalyst layer 26 through the separator 10. As a result, the path-length for the protons is reduced to the thickness of the separator 10. A suitable thickness for the separator 10 is a thickness is about 100 µm to 1 mm.

The absorption of light by the photocathode light absorber 18 generates hole-electron pairs within the photocathode light absorber 18. The presence of a p-type photocathode light absorber 18 in the second phase 22 produces an electrical field that causes the electrons within the photocathode light absorber 18 to move to the cathode electrical conductor 29. The electrons can then flow through the reduction electrical conductor 56 to the one or more reduction catalyst layers 26 where they react with the protons that travel through the separator 10 to form hydrogen gas. The reduction of the protons is labeled reaction 2 in FIG. 3B. The resulting hydrogen gas can be stored for use as hydrogen fuel. The holes generated in the photocathode light absorber 18 by the absorption of light move from the photocathode light absorber 18 toward the photoanode light absorber 16 as a result of the electrical field and can recombine with the electrons from the photoanode light absorber 16.

The anode electrical conductors 27 and the oxidation electrical conductors 52 are shown as being in direct physical contact in FIG. 3B. However one or more secondary electrical conductors can be employed to achieve electrical communication between the anode electrical conductors 27 and the oxidation electrical conductors 52. For instance, an electrically conducting paste and/or adhesive backed copper can electrically connect the anode electrical conductors 27 and the oxidation electrical conductors 52. Additionally or alternately, the dashed line across the anode electrical conductor 27 in FIG. 3B can optionally represent an interface between the anode electrical conductor 27 and a secondary electrical conductor 58. As a result, the anode electrical conduit can include or consist of an anode electrical conductor 27, an oxidation electrical conductor 52, and one or more secondary conductors. A suitable secondary electrical conductor includes, but is not limited to, a wire, metal foil, metal pastes and polymer films.

The power generating components 32 have a length labeled $L_1$ in FIG. 3B and the fuel generating components 34 have a length labeled $L_2$ in FIG. 3B. The ratio of $L_1:L_2$ is selected such that the fuel generating components 34 are not overwhelmed. As the length of the power generating components 32 increases, it may be desirable to increase the level of electrical conductivity between the photoanode light absorber 16 and the oxidation electrical conductor 52. Additionally or alternately, it may be desirable to increase the level of electrical conductivity between the photocathode light absorber 18 and the reduction electrical conductor 56. The level of electrical conductivity between the photoanode light absorber 16 and the oxidation electrical conductor 52 can be increased by attaching an electrically conducting grid (not shown) to the top of the anode electrical conductor 27. The electrically conducting grid can optionally be in electrical communication with the oxidation electrical conductor 52. The level of electrical conductivity between the photocathode light absorber 18 and the reduction electrical conductor 56 can be increased by attaching an electrically conducting grid (not shown) to the top of the cathode electrical conductor 29. The electrically conducting grid can optionally be in electrical communication with the reduction electrical conductor 56. Because these grids can reduce the amount of light that reaches the photocathode light absorber 18 and/or the photoanode light absorber 16, it may be desirable to design the power generating components 32 with a length that does not require the use of these grids. Suitable grids include grids made of metals such as copper, silver and stainless steel. A suitable ratio for $L_1:L_2$ includes ratios of between 1:1 and 100:1.

The cathode electrical conductors 29 and the reduction electrical conductors 56 are shown as being in direct physical contact with one another in FIG. 3B. However one or more secondary electrical conductors can be employed to achieve electrical communication between the cathode electrical conductors 29 and the reduction electrical conductors 56. For instance, an electrically conducting paste and/or adhesive backed copper can electrically connect the cathode electrical conductors 29 and the reduction electrical conductors 56. Additionally or alternately, the dashed line across the cathode electrical conductor 29 in FIG. 3B can optionally represent an interface between the cathode electrical conductor 29 and a secondary electrical conductor. As a result, the cathode electrical conduit can include or consist of a cathode electrical conductor 29, a reduction electrical conductor 56, and one or more secondary conductors. A suitable secondary electrical conductor includes, but is not limited to, a wire, metal foil, metal pastes and polymer films.

As is shown in FIG. 3B, the power generating components 32 can be positioned at an angle α relative to the fuel generating components 34. The angle α can be selected so as to provide the most efficient interaction between the incoming light and the power generating components 32. Suitable angles for the angle α include, but are not limited to angles between about 80° and 100°.

The one or more oxidation catalyst layers 24 illustrated in FIG. 3B can include materials in addition to the oxidation catalyst. For instance, an oxidation catalyst layer 24 can include one or more components selected from a group consisting of electrically conductive fillers, electrically conductive materials, diluents, and/or binders. The one or more reduction catalyst layers 26 illustrated in FIG. 3B can include materials in addition to the oxidation catalyst. For instance, a reduction catalyst layers 26 can include one or more components selected from a group consisting of electrically conductive fillers, electrically conductive materials, diluents, and/or binders.

Although FIG. 3B illustrates the oxidation electrical conductor 52 between the one or more oxidation catalyst layers 24 and the separator 10, one or more of the one or more oxidation catalyst layers 24 can be between the oxidation electrical conductor 52 and the separator 10. The one or more oxidation catalyst layers 24 can be coated on the oxidation electrical conductor 52 or the oxidation electrical conductor 52 can be coated on the one or more oxidation catalyst layers 24. Alternately, the combination of layers represented by the oxidation catalyst layer 24 shown in FIG. 1A and the oxidation electrical conductor 52 can be a single layer. For instance, one or more oxidation catalysts can be dispersed through a layer that includes or consists of the oxidation electrical conductor 52 or the oxidation electrical conductor 52 can be dispersed through a layer that includes or consists of one or more of the oxidation catalysts. As an example, the combination of layers represented by the oxidation catalyst layer 24 and the oxidation electrical conductor 52 can be a single layer where an oxidation catalyst or particles of the oxidation catalyst are coated onto the oxidation electrical conductor 52. As a result, the oxidation catalyst or particles of the oxidation catalyst can be located in pores of a porous oxidation electrical conductor 52 such as a metal mesh. A suitable method for forming a layer that includes oxidation catalyst or particles of the oxidation catalyst in pores of a metal mesh includes hot pressing the mesh to layer of material that includes the oxidation catalyst.

Although FIG. 3B illustrates the reduction electrical conductor 56 between the one or more reduction catalyst layers 26 and the separator 10, one or more of the reduction catalyst layers 26 can be between the reduction electrical conductor 56 and the separator 10. The one or more reduction catalyst layers 26 can be coated on the reduction electrical conductor 56 or the reduction electrical conductor 56 can be coated on the one or more reduction catalyst layers 26. Alternately, the combination of layers represented by the one or more reduction catalyst layers 26 and the reduction electrical conductor 56 can be a single layer. For instance, one or more reduction catalysts can be dispersed through a layer that includes or consists of the reduction electrical conductor 56 or the reduction electrical conductor 56 can be dispersed through a layer that includes or consists of one or more reduction catalysts. As an example, one or more reduction catalysts or particles of one or more reduction catalysts can be located in pores of a porous reduction electrical conductor 56 such as a metal mesh. A suitable method for forming a layer that includes reduction catalyst or particles of the reduction catalyst in pores of a metal mesh includes hot pressing the mesh to layer of material that includes the reduction catalyst.

A suitable method for forming the anode electrical conductor 27 on the photoanode includes, but is not limited to, spin coating, physical vapor deposition, spray pyrolysis, atomic layer deposition, electrodeposition and electroless deposition. A suitable method for forming the cathode electrical conductor 29 on the photocathode includes, but is not limited to, spin coating, physical vapor deposition, spray pyrolysis, atomic layer deposition, electrodeposition and electroless deposition. A suitable method for achieving electrical communication between the anode electrical conductor 27 and the oxidation electrical conductor 52 includes, but is not limited to, the use of conductive paste and/or adhesive copper tapes.

Protective layers can optionally be positioned on one or more of the components disclosed above. For instance, a transparent protective layer (not shown) can be positioned on the anode electrical conductors 27 and/or on cathode electrical conductors 29. The protective layers can reduce physical damage as well as chemical damage through chemical processes such as corrosion.

In other embodiments, the side opposite incident light may further comprise a reflective material. For example, with reference to FIG. 3B, the cathode electrical conductor 29 may be reflective or may optionally include a reflective material on the side furthest from the incident light. Similarly, if incident light is coming from the opposite direction the anode electrical conductor 27 can comprise a reflective material or may have a layer of reflective material on the side furthest from the incident light.

Figure 4A:
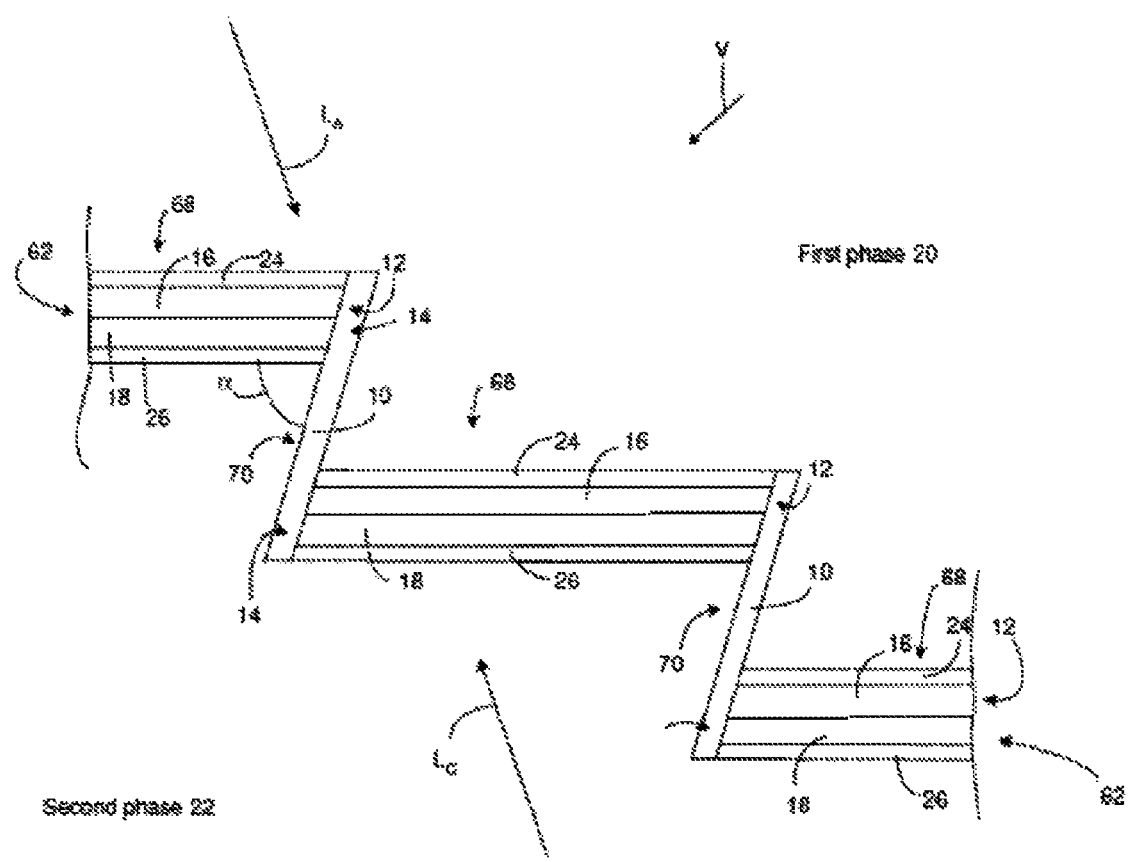
FIG. 4A is a cross section of another embodiment of a solar fuels generator.
Figure 4B:
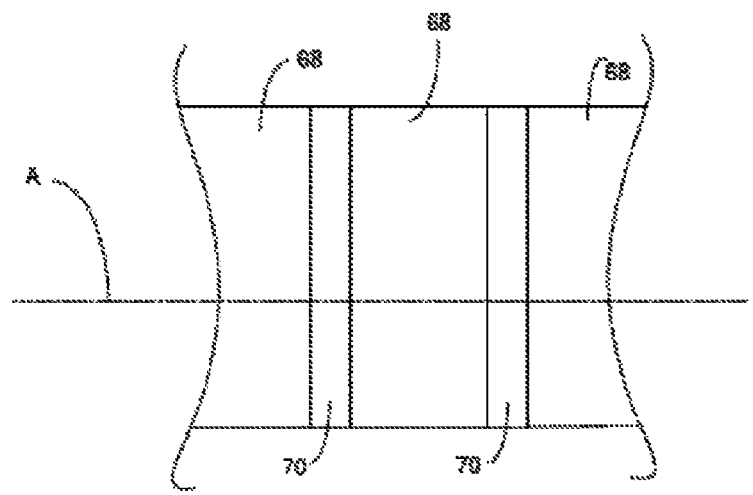
FIG. 4B is a sideview of the solar fuels generator shown in FIG. 4A taken looking in the direction of the arrow labeled V in FIG. 4A.

FIG. 4A is a cross section of another embodiment of a solar fuels generator. FIG. 4B is a sideview of the solar fuels generator shown in FIG. 4A taken looking in the direction of the arrow labeled V in FIG. 4A. The cross section shown in FIG. 4A can be taken along the line labeled A in FIG. 4B. The solar fuel generators of FIG. 4A-C are particularly suited for the use of electrolyte feedstocks.

The solar fuels generator includes a barrier 62 between a first phase 20 and a second phase 22. The barrier 62 includes or consists of one or more reaction components 68 and one or more separator components 70. FIG. 4A illustrates the reaction components linked with separator components 70 so as to form the barrier 62 between the first phase 20 and the second phase 22. The reaction components 68 are alternated with the separator components 70. The reaction components 68 each contacts both the first phase 20 and the second phase 22 and the separator components 70 each contacts both the first phase 20 and the second phase 22. The barrier 62 is formed such that the first phase 20 can be maintained at a different chemical composition than the second phase 22. For instance, the barrier 62 can be impermeable or substantially impermeable to nonionic atoms and/or nonionic compounds.

The reaction components 68 include photoanodes 12 and photocathodes 14. As illustrated by the arrow labeled $L_A$ and $L_C$, light is incident on the photoanodes 12 and/or photocathodes 14 during operation of the solar fuels generator. The photoanodes 12 and photocathodes 14 convert the received light into excited electron-hole pairs that drive a chemical reaction such as electrolysis of water. The photoanodes 12 include a photoanode light absorber 16 selected to absorb light at a wavelength to which the photoanodes 12 will be exposed during operation of the solar fuels generator. Additionally, the photocathodes 14 include a photocathode light absorber 18 selected to absorb light at a wavelength to which the photocathodes will be exposed during operation of the solar fuels generator.

Suitable materials for the photoanode light absorbers 16 and the photocathode light absorbers 18 include, but are not limited to, semiconductors. In some instances, the photoanode light absorbers 16 include or consist of a semiconductor and/or the photocathode light absorbers 18 include or consist of a semiconductor. The bandgap of the semiconductors included in the photoanode light absorbers 16 can be larger than the bandgap of the semiconductors included in the photocathode light absorbers 18. Suitable semiconductors for the photoanode light absorbers 16 include, but are not limited to, metal oxides, oxynitrides, sulfides, and phosphides that are stable in an oxidizing environment such as $WO_3$, $TiO_2$, and TaON. Suitable semiconductors for the photocathode light absorbers 18 include, but are not limited to, p-type silicon, InP, $Cu_2O$, GaP, and $WSe_2$.

In some instances, the photoanode light absorbers 7616 and/or the photocathode light absorbers 18 are doped. The doping can be done to form one or more pn junctions within the photoanode light absorbers 16 and the photocathode light absorbers 18. For instance, the photoanode light absorber 16 can be an n-type semiconductor while the photocathode light absorber 18 can be a p-type semiconductor. A pn junction can also be present within either the photocathode light absorbers 18 or the photoanode light absorber 16 or both, and is arranged so that electrons flow from the photocathode light absorber 18 to a reduction catalyst (discussed below) and holes flow from the photoanode light absorber 16 to an oxidation catalyst (discussed below).

The dashed lines at the interface of the photoanode light absorber 16 and the photocathode light absorber 18 illustrate an interface between the materials of the photoanode light absorber 16 and the photocathode light absorber 18. However, the photoanode light absorber 16 and the photocathode light absorber 18 can be the same material and/or include the same dopant. As a result, a photoanode light absorber 16 and the interfaced photocathode light absorber 18 can be a continuous block of material. In these instances, the dashed lines shown in FIG. 4A may represent a feature that is not discernable in the solar fuels generator. One example of a material that can serve as both the photoanode light absorber 16 and the photocathode light absorber 18 is p-type silicon, which can function as the absorber on both the photoanode and photocathode. In particular, p-type silicon is a candidate for the photocathode material because it is cathodically stable under illumination in acidic aqueous media and in conjunction with various metal catalysts can evolve $H_2$ (g) from $H_2O$.

Other possible choices for the light photoanode light absorber 16 and/or the photocathode light absorber 18 include semiconductors having wider bandgaps than silicon that are stable in a water vapor medium such as oxide semiconductors. Some of the oxide semiconductors that can be used as a light absorber include, but are not limited to: tandem structure photoanodes, including tungsten oxide ($WO_3$), bismuth vanadium oxide ($BiVO_4$), tantalumoxynitride (TaON), and titanium oxide ($TiO_2$); tandem structure photocathodes, including silicon (Si), cuprous oxide (Cu2O), gallium phosphide (GaP), gallium arsenide (GaAs), and indium phosphide (InP); single material electrodes, including strontium titanate ($SrTiO_3$), strontium niobate ($SrNbO_3$), and titanium oxide ($TiO_2$); multifunction photovoltaics, including triple junction amorphous silicon (a-Si), and vertically stacked epitaxially grown III-V semiconductors with tunnel junctions; and series connected photovoltaics, including silicon (Si) cells, gallium arsenide (GaAs) cells, cadmium telluride (CdTe) cells, and Copper Indium Gallium Selenide (CIGS) thin film cells.

The absorption of light by the photocathode light absorber 18 and the photoanode light absorber 16 generates the photovoltage that drive a reaction such as water electrolysis. When semiconductors are used for the photocathode light absorber 18 and the photoanode light absorber 16, the achievable voltage depends on the choice of semiconductor materials, the associated bandgaps, and doping arrangements as is known in the solar cell arts. Accordingly, the material selections and arrangements can be selected to provide the desired voltage levels. For instance, the tandem and multijunction structures discussed above in which two or more semiconductors in series add their voltages together can be used in order to achieve elevated voltages.

The photoanodes 12 include one or more oxidation catalyst layers 24 that each include or consist of one or more oxidation catalysts. One or more oxidation catalyst layers 24 can be in direct physical contact with the photoanode light absorber 16. As is evident from FIG. 4A, when light is to be incident on the photoanode, the light passes through one or more oxidation catalyst layers 24 before reaching the photoanode light absorber 16. As a result, the one or more oxidation catalyst layers 24 can be transparent and/or thin enough that the one or more oxidation catalyst layers 24 do not absorb an undesirably high level of the incoming light. A suitable thickness for an oxidation catalyst layer 24 includes, but is not limited to, a thickness less than 10 nm to a few micrometers.

A suitable oxidation catalyst catalyzes oxidation of components in the first phase so as to form a cation in a first reaction. Suitable oxidation catalysts include, but are not limited to, $IrO_2$, $RuO_2$, $Co_2O_4$, $MnO_2$, $NiFeO_x$ where x is greater than 1 and/or less than 4, $IrRuO_y$ where y is greater than 1 and/or less than 4, $NiLaO_z$ where z is greater than 1 and/or less than 4, $BaSrCoFeO_z$, where z is greater than 1 and/or less than 4, platinum (Pt), and mixtures thereof. One example of a suitable oxidation catalyst is a 1:1 $IrO_2$:$RuO_2$. The oxidation catalyst layer 24 is positioned on a surface of the photoanode light absorber 16 such that a line that is perpendicular to the surface extends from the surface through the oxidation catalyst layer 24 before extending through the first phase 20. The one or more oxidation catalyst layers 24 can be positioned such that the one or more oxidation catalyst layers 24 are on more than 10%, 30%, 50%, 75%, or 90% of the surface of the photoanode light absorber 16.

The photocathodes 14 include one or more reduction catalyst layers 26 that each includes or consists of one or more reduction catalysts. One or more reduction catalyst layers 26 can be in direct physical contact with the photocathode light absorber 18 as is shown in FIG. 4A. As is evident from FIG. 4A, when light is to be incident on the photocathode, the light passes through one or more reduction catalyst layers 26 before reaching the photocathode light absorber 18. As a result, the one or more reduction catalyst layers 26 can be transparent and/or thin enough that the one or more reduction catalyst layers 26 do not absorb an undesirably high level of the incoming light. A suitable thickness for a reduction catalyst layer 26 includes, but is not limited to, a thickness of about 1 nm to 10 µm. It should be noted that catalyst layer 26 does not need to be transparent if it is facing down (i.e., is away from the incident light source).

A suitable reduction catalyst catalyzes reduction of the cation generated in the first reaction. Suitable reduction catalysts include, but are not limited to, Pt, NiMo, and NiCo. The one or more reduction catalyst layers 26 are positioned on a surface of the photocathode light absorber 18 such that a line that is perpendicular to the surface extends from the surface through one or more of the reduction catalyst layers 26 before extending through the second phase 22. The one or more reduction catalyst layers can be positioned such that the one or more reduction catalyst layers are on more than more than 10%, 30%, 50%, 75%, or 90% of the surface of the photocathode light absorber 18.

The separator components 70 include or consist of a separator 10 located between the first phase 20 and the second phase 22. The separator 10 is ionically conductive. In some instances, the separator 10 is cationically conductive while concurrently being sufficiently nonconductive to the other components of the first phase 20 and the second phase 22 that the first phase 20 and the second phase 22 remain separated from one another. For instance, in some instances, the separator 10 is cationically conductive and non-conductive or substantially non-conductive to nonionic atoms and/or nonionic compounds. In some instances, the separator 10 is cationically conductive while being non-conductive or substantially non-conductive to nonionic atoms and/or nonionic compounds and also to anions. Accordingly, the separator 10 can provide a pathway along which cations can travel from the first phase 20 to the second phase 22 without providing a pathway or a substantial pathway from the first phase 20 to the second phase 22 to one, two, or three entities selected from a group consisting of anions, nonionic atoms or nonionic compounds. In some instances, it may be desirable for the separator 10 to conduct both anions and cations. For instance, when the first phase 20 and/or the second phase 22 has elevated pH levels a separator 10 that conducts both anions and cations may be used. As a result, in some instances, the separator 10 conducts cations and anions but not nonionic atoms or nonionic compounds.

Additionally, the separator 10 should be able to exchange ions sufficiently to prevent the buildup of a pH gradient, and separate the reaction products sufficiently to prevent them from re-combining. A suitable separator 10 can be a single layer or material or multiple layers of material. Suitable materials for the separator 10 include, but are not limited to, ionomers and mixtures of ionomers. Ionomers are polymers that include electrically neutral repeating units and ionized repeating units. Suitable ionomers include copolymers of a substituted or unsubstituted alkylene and an acid such as sulfonic acid. In one example, the ionomer is a copolymer of tetrafluoroethylene and perfluoro-3,6-dioxa-4-methyl-7-octene-sulfonic acid. An example is represented by the following Formula I:

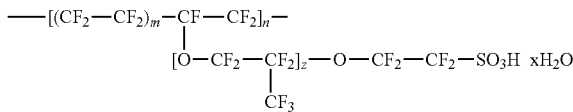

wherein m, n, and z are each greater than 0, or each greater than 1. A suitable material having a structure according to Formula I is sold under the trademark NAFION®. NAFION® is an example of a material that is cationically conductive of cations but is not conductive of anions or nonionic atoms or nonionic compounds. Another suitable separator 10 includes NAFION® functionalized with one or more components selected from a group consisting of dimethylpiperazinium cationic groups, glass frits, asbestos fibers, block copolymer formulated layers, and poly(arylene ether sulfone) with quaternary ammonium groups.

During operation, the solar fuels generator is exposed to light such as sunlight, terrestrial solar illumination, AM1 solar radiation, or similar illumination having approximately 1 kilowatt per square meter of incident energy or less. These light sources can be unconcentrated or can be concentrated using known light concentration devices and techniques. In some instances, the solar fuels generator is oriented such that the light travels through the photoanodes before reaching the photocathodes. When the photoanode light absorber 16 has a larger bandgap than the photocathode light absorber 18, the photoanodes absorb higher energy (shorter wavelength) light and allow lower energy (longer wavelength) light to pass through to the photocathodes. The photocathodes can then absorb the longer wavelengths. Alternately, the light can be incident on both the photoanodes and the photocathodes or can be incident on the photocathodes before reaching the photoanodes.

The absorption of light by a photoanode light absorber 16 generates hole-electron pairs within the photoanode light absorber 16. The presence of an n-type photoanode light absorber 16 in the first phase 20 produces an electrical field that causes the holes to move to the surface of the photoanode light absorber 16 and then the surface of the oxidation catalyst layer 8246 where the oxidation of a component in the first phase is catalyzed so as to generate a component cation. The electrons generated in the photoanode light absorber 16 move toward the photocathode light absorber 18 as a result of the electrical field.

The component cations can move from the oxidation catalyst layer 24 into the first phase 20. Since the separator 10 is cationically conductive, the component cations move from the first phase 20 to the second phase 22 through the separator 10. As a result, the pathlength for the component cation is reduced to the thickness of the separator 10. A suitable thickness for the separator 10 is a thickness of about 100 nm to 1 µm or more.

The absorption of light by the photocathode light absorber 18 generates hole-electron pairs within the photocathode light absorber 18. The presence of a p-type photocathode light absorber 18 in the second phase 22 produces an electrical field that causes the electrons within the photocathode light absorber 18 to move to the surface of the photocathode light absorber 18 and then the surface of the reduction catalyst layers 26 where they react with the component cations to form the fuel output by the solar fuels generator. The generated fuel can enter the second phase 22 and can be stored for later use. The holes generated in the photocathode light absorber 18 by the absorption of light move from the photocathode light absorber 18 toward the photoanode light absorber 16 as a result of the electrical field and can recombine with the electrons from the photoanode light absorber 16.

The first phase 20 is generally different from the second phase 22. For instance, the first phase 20 generally has a different chemical composition than the second phase 22. The first phase 20 can be a liquid or a gas. However, as is evident from the above discussion, the component cation travels from the oxidation catalyst layer 24 to the separator 10 through the first phase 20. Since gasses typically do not provide an efficient pathway for the component cations to travel from the oxidation catalyst layer 24 to the separator 10, the first phase can be a liquid that provides an efficient pathway from the oxidation catalyst layer 24 to the separator 10. For instance, the first phase 20 can be a standing, ionically conductive liquid such as a liquid electrolyte.

As is shown in FIG. 4A, the reaction components 68 can be positioned at an angle α relative to the separator components 70. The angle α can be selected so as to provide the most efficient interaction between the incoming light and the reaction components 68. Suitable angles for the angle α include, but are not limited to, angles of between about 80° and 100°.

The one or more oxidation catalyst layers 24 illustrated in FIG. 4A can include materials in addition to the oxidation catalyst. For instance, an oxidation catalyst layer 24 can include one or more components selected from a group consisting of electrically conductive fillers, electrically conductive materials, diluents, and/or binders. The one or more reduction catalyst layers 26 illustrated in FIG. 4A can include materials in addition to the one or more reduction catalysts. For instance, a reduction catalyst layer 26 can include one or more components selected from a group consisting of electrically conductive fillers, electrically conductive materials, diluents, and/or binders. In other embodiments, the side opposite incident light may further comprise a reflective material. For example, with reference to FIG. 4A, the catalyst layers may further comprise a reflective material on the side facing the different phase compositions (e.g., 20 or 22).

A suitable method for forming oxidation catalyst layers 24 on the photoanode light absorber 16 includes, but is not limited to, electrodeposition, sputtering, electroless deposition, spray pyrolysis, atomic layer deposition, etc. A suitable method for forming reduction catalyst layers 26 on the photocathode light absorber 18 includes, but is not limited to, electrodeposition, sputtering, electroless deposition, spray pyrolysis, atomic layer deposition, etc. A suitable method for attaching the separator 10 to the photoanodes 12 and/or photocathodes 14 includes, but is not limited to, clamping, lamination, sealing with epoxy or glue and the like.

The layers represented by the oxidation electrical conductor 52 and the one or more oxidation catalyst layers 24 in FIG. 3B can alternately be constructed with the construction disclosed for the cation conduits 28 and oxidation catalyst layer 24 disclosed in the context of FIG. 1A through FIG. 3A. For instance, oxidation electrical conductor 52 and the one or more oxidation catalyst layers 24 can be replaced by one or more layers that include cation conduit, one or more oxidation catalysts, and electrical conductor such as a current collector as is disclosed in the context of FIG. 1A through FIG. 3A. In these instances, the anode electrical conductor 27 is in electrical communication with the electrical conductor such as a current collector. Additionally or alternately, the layers represented by the reduction electrical conductor 56 and the one or more reduction catalyst layers 26 in FIG. 3B can alternately be constructed with the construction disclosed for the cation conduits 28 and the one or more reduction catalyst layers 26 disclosed FIG. 1A through FIG. 3A. For instance, the reduction electrical conductor 56 and the one or more reduction catalyst layers 26 can be replaced by one or more layers that include a cation conduit, one or more reduction catalysts, and electrical conductor such as a current collector as is disclosed in the context of FIG. 1A through FIG. 3A. In these instances, the cathode electrical conductor 29 is in electrical communication with the electrical conductor such as a current collector.

Figure 5:
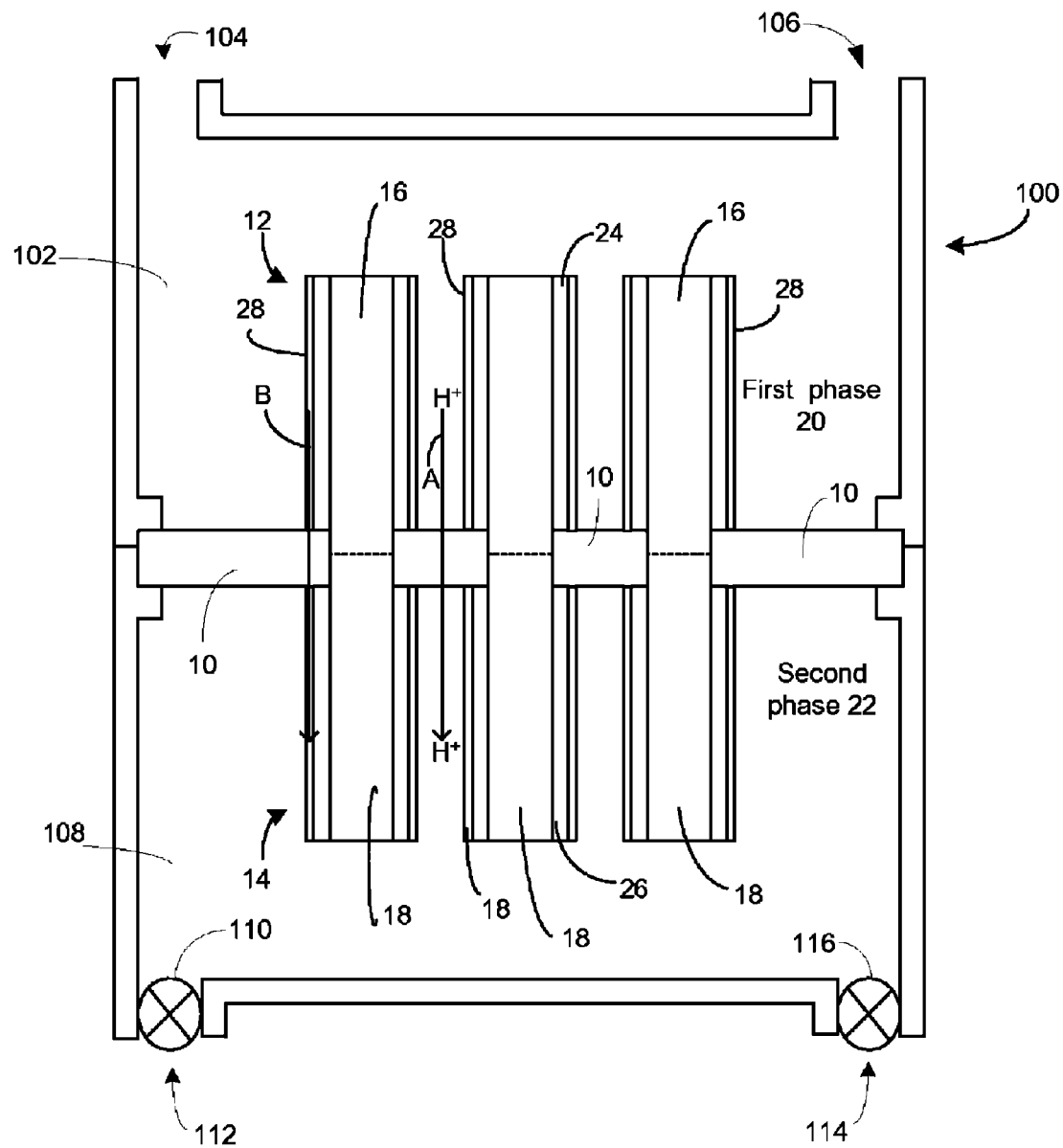
FIG. 5 illustrates the solar fuels generator of FIG. 1 included in a system that permits control of delivery of feedstocks to solar fuels generator and removal of the resulting fuel from the solar fuels generator.

FIG. 5 illustrates the solar fuels generator of FIG. 1 included in a system that permits control of delivery of feedstocks to the solar fuels generator and removal of the fuel from the solar fuels generator. Although the system of FIG. 5 includes the solar fuels generator of FIG. 1, the illustrated system can be used in conjunction with the other solar fuels generators disclosed above.

The solar fuels generator is positioned in an enclosure 100 such that the solar fuels generator separates the first phase and the second phase. All or a portion of the enclosure 100 can be fully or partially transparent to the light that is to be incident on the electrodes. The enclosure 100 defines a first chamber 102 having an inlet port 104 and an outlet port 106. The feedstock can enter the first chamber 102 through the inlet port 104 and the resulting contents of the first chamber 102 can exit the first chamber 102 through the outlet port 106. In the case where the feedstock is a gas that includes water vapor, the gas can enter the first chamber 102 through the inlet port 104 and exit the chamber through the outlet port 106. As a result, the inlet port 104 and the outlet port 106 can be used to control the content and characteristics of the first phase.

The enclosure 100 can also define a second chamber 108 having an inlet port 112 that optionally includes an inlet valve 110 and an outlet port 114 that optionally includes an outlet valve 116. A gaseous or liquid supply stream can enter the second chamber 108 through inlet port 112 and the resulting second phase can exit the second chamber 108 through the outlet port 114. As a result, the inlet port 112 and the outlet port 114 can be used to control the content and characteristics of the second phase. For instance, the second chamber 108 can be filled and maintained in a close state by closing the two valves on the inlet port 112 and the second outlet port 114 so that a reaction can be run in a batch mode. Alternatively, the valves can be maintained in an open condition or removed from the system so that a reaction can be run in a continuous mode.

When the above solar fuels generators are employed for electrolysis of water, the reaction that takes place on the reduction side of the solar fuels generator can be supported entirely by the flux of protons ($H^+$) that flow across the separator, and no net provision of protons on the reduction side from another source is needed but can optionally be provided. However, in some instances, it may be advantageous to have a source of water or water vapor on the reduction side of the solar fuels generator. For instance, the supply stream and second phase can include water or water vapor. The presence of water or water vapor in the supply stream can help to hydrate the separator. Separators such as NAFION® should be hydrated in order to maintain high ionic conductivity because water preferentially fills hydrophilic, negatively charged channels enable the selective transfer of protons across the separator. Without sufficient water present, the channels constrict and the separator conductivity is significantly reduced. In addition or as an alternative to including water or water vapor in the supply stream, hydration of the separator may be possible by periodically or continually sprinkling or misting the separator with water. Alternatively, a NAFION® separator could be fabricated with a web of hydroponic polymer integrated into the separator that would wick water from a reservoir located in the system. In some instances, separator materials that are less sensitive to water content are used.

In addition or as an alternative to water and/or water vapor, the supply stream and/or second phase can include a carrier gas. The carrier can be selected to carry away the generated fuel to a collection location. Additionally or alternately, the carrier gas can be used to maintain a target pressure within the second chamber 108. In some instances, a suitable pressure is in the approximate range of 1 atmosphere or ambient pressure. A suitable carrier gas for inclusion in the second phase includes, but is not limited to, Ar, Nitrogen and $CO_2$.

The supply stream and/or the second phase can also include or consist of a reactant. Although the above discussion discloses using the solar fuels generator to generate hydrogen gas for use as a fuel, the solar fuels generator can be employed to generate other fuels that include hydrocarbons such as methane. Hydrocarbon fuels include or consists of carbon and hydrogen and may include or consist of carbon, hydrogen, and oxygen. These fuels can be generated by delivering an additional reactant to the catalysts. For instance, the supply stream and/or second phase can include one or more additional reactants. The following generalized reaction can represent the overall reaction used by the solar fuels generator in the generation of these fuels:

$$MCO_2 + NH_2O \rightarrow C_M H_2 NO_{(2M+N-2P)} + PO_2 \quad \text{(Equation 1)}$$

where M, N, and P are non-negative numbers and, in some instances, are integers. $C_M H_2 NO_{(2M+N-2P)}$ represents the fuel produced in this reaction and $CO_2$ serves as the reactant that is delivered to the catalysts. Examples of the fuels that can be produced using this reaction in combination with the disclosed solar fuels generator include carbon monoxide, methanol, methane, ethanol, and formic acid. The following table 1 presents values for M, N and P that can be used to generate a particular fuel.

TABLE 1

| M | N | P | Fuel | Chemical Name |
|---|---|---|------|---------------|
| 1 | 2 | 2 | $CH_4$ | Methane |
| 2 | 4 | 3 | 2 molecules of $CH_3OH$ produced | Methanol |
| 2 | 2 | 1 | 2 molecules of HCOOH produced | Formic acid |
| 2 | 2 | 2 | $CH_3COOH$ | Acetic Acid |
| 2 | 3 | 3 | $C_2H_6O$ | Ethanol |
| 3 | 3 | 4 | $CH_3CH_2COH$ | Propanol |
| 3 | 4 | 4 | $HOCH_2CH_2CH_2OH$ | 1,3-Propanediol |
| 4 | 3 | 4 | $CH_3CH_2COCOOH$ | 2-Oxybutyric acid |
| 4 | 5 | 6 | $CH_3CH_2CH_2COH$ | Butanol |
| 6 | 6 | 6 | $C_6H_{12}O_6$ | Glucose |

The half reactions for each of the above fuels illustrate how the solar fuels cell generates a particular one of the hydrocarbon fuels in the above Table 1. For instance, when using the solar fuels cell to generate methanol, the half reactions and the overall reaction are as follows:

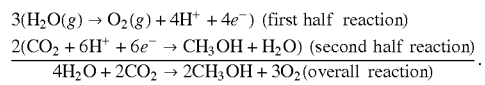

Since the overall reaction is Equation 1 with M=N=P=6, these half reactions show the relationship between the overall reaction and the half reactions on the different sides of the solar fuels generator. Additionally, the first reaction is the same as the first reaction disclosed in the context of FIG. 1 and FIG. 3B. The protons and electrons are provided to the reduction catalyst as a result of the reaction at the oxidation catalyst followed by flow of the protons across the separator. As a result, the primary chemical change needed to generate methanol instead of hydrogen is the delivery of the $CO_2$ to the reduction catalyst as a reactant.

As is evident from Equation 1, each of the hydrocarbon fuels generated through the use of Equation 1 is generated by delivering $CO_2$ to the reduction catalyst as a reactant. It is believed that a particular one of the hydrocarbon fuels can be generated by controlling variables such as the proportions (or partial pressures) of the reactant, the temperature of the reaction, the voltages applied to the catalysts, and the chemical composition of the catalysts. The Equation 1 reaction that produces glucose represents photosynthesis. Photosynthesis occurs at ambient temperatures in the vicinity of room temperature (e.g., in the range of 10 to 40° C., and possibly in the range of 0 to 100° C.). As a result, it is believed that operating the solar fuels generator at temperatures in these ranges can generate glucose.

When the second phase includes a reactant, the reduction catalyst can be altered to catalyze the reduction reaction. For instance, when the second phase includes $CO_2$ as a reactant, a suitable reduction catalyst can include one or more components selected from the group consisting of copper (Cu), zinc (Zn), tin (Sn), nickel (Ni), platinum (Pt), palladium (Pd), rhodium (Rh), iridium (Ir), metal porphyrins and phthalocyanines. Other metals can also serve as a reduction catalyst when the second phase includes $CO_2$ as a reactant.

Although the enclosure 100 is disclosed as defining two chambers, a suitable enclosure 100 may be configured to define a single chamber in which the first phase is positioned or in which the second phase is positioned. In some instances, the enclosure 100 includes heating elements in order to permit the solar fuels generator to operate at higher temperatures. The heating elements can be active heating elements that require an external energy source such as resistive heaters, heated fluid heaters, or combustion based heaters. Additionally or alternately, the heating elements can be passive heating elements where an external energy source is not required. For instance, the heating elements can be a black body layer that produces heat by collecting light not absorbed by the photoanode light absorbers or the photocathode light absorbers. Additionally or alternately, elevated temperatures may be achieved by heating the supply stream and/or the feedstock. Elevated temperatures may be able to provide higher current densities. Further, higher temperature gasses can have a greater water content that can further increase the current density. Additionally, the use of elevated temperatures may aid in generating particular hydrocarbons. Since the following experimental results establish that hydrolization of water can be achieved using only solar illumination at atmospheric conditions as the only energy source for the solar fuels generator, in some instances, the system excludes active heating elements and/or passive heating elements.

EXAMPLES

Example 1

An electrolyzer was used to explore the performance of the solar fuels generator with water vapor as the feedstock.

The electrolyzer components were obtained from Clean Fuel Cell Energy, LLC, 3350 Ulmerton Road, Suite 23, Clearwater, Fla. 33762). In contrast to the solar fuels generators disclosed above, the electrolyzer used an external power source to generate the electrolysis voltage. The electrolyzer included two graphite end plates (one for the photoanode and one for the photocathode) that had serpentine gas flow channels (1.8 mm wide, 2.0 mm deep, spaced 1.0 mm apart) grooved into the side of the plate that faced the separator. The channels represented ~80% of the active area of the separator that was directly exposed to the input gas flow. In other embodiments, a serpentine pattern having narrower channels and closer spacing may be advantageous to better match the electrical characteristics of the catalysts (such as charge carrier diffusion lengths) and the mechanical spacing of the graphite contacts to the catalysts. The separator was NAFION® (available from Lynntech Inc., 2501 Earl Rudder Freeway South, Suite 100, College Station, Tex. 77845, NAFION® 115, 127 µm thick) that had a oxidation catalyst loading of 3.0 mg cm$^{-2}$ of IrRuO$_x$ (1:1 IrO2:RuO2) and a reduction catalyst loading of 3.0 mg cm$^{-2}$ of Pt black. The projected active area of the separator was 5 cm$^2$. Gas diffusion layers were not used, due to the instability under electrolysis conditions of the carbon-based material in a typical gas diffusion layer.

Ultra-high purity Argon gas (UHP Ar(g)) (>99.99%) was used as the carrier gas in all experiments, except for those specifically identified experiments in which the carrier gas was either N$_2$ (g) (>99.99%) or house air (1.10±0.15 ppth of water vapor). The carrier gas was saturated with water vapor by passing the gas at a flow rate of 0.04-0.5 L min-1 (controlled by flowmeters from Chemglass) through a bubbler that had been filled with 18 MΩ-cm resistivity deionized H$_2$O, obtained from a Barnstead Nanopure system. The humidified gas stream was mixed with a dry gas stream, both at controlled flow rates, to create a gas flow of the desired relative humidity (RH). The system produced precise (±2% RH) and reproducible humidity values in the gas flow stream, as monitored by a relative humidity probe (Omega, RH-USB sensor). A water-saturated carrier gas stream to which dry gas had not been added had a RH of ~95%. To minimize the back diffusion of ambient oxygen into the electrolysis unit, the output stream from the electrolyzer was bubbled through an oil bath. For the electrolysis of liquid water, the electrolyzer cell was immersed in 18 MΩ-cm resistivity H$_2$O(l) that had been deoxygenated by bubbling with Ar(g) for >1 h. All experiments were conducted at an ambient temperature of 20° C.

The electrolyzer was allowed to equilibrate at open circuit for more than 2 h before measurements of the current density-voltage (J-V) behavior under each set of experimental conditions (flow rate, RH, etc.) were performed. An SI model 1286 Schlumberger Potentiostat was used to apply a DC bias to the electrolyzer cell, and to measure the current through the cell, through current collector pins in contact with each of the graphite end plates of the electrolysis unit. The current reached an approximate steady state value after more than 300 s at each applied bias. The J-V behavior was also measured by sweeping the voltage, at a scan rate of 1 mV s$^{-1}$, from open circuit to 2.6 V. The current values measured at a given potential in the scan were in close agreement with the current that was measured at that same potential after 300 s under potentiostatic conditions. The current density was determined using the projected area of the active part of the separator electrode assembly without correcting for the estimated area in direct contact with the graphite end plates of the electrolyzer. In an electrolyzer for use in a system having no electrical connection to an external power source, a photoabsorber such as a photovoltaic cell or photovoltaic array can be used to provide the potential between the photocathode and the photoanode, to provide the needed charge carriers.

Figure 6:
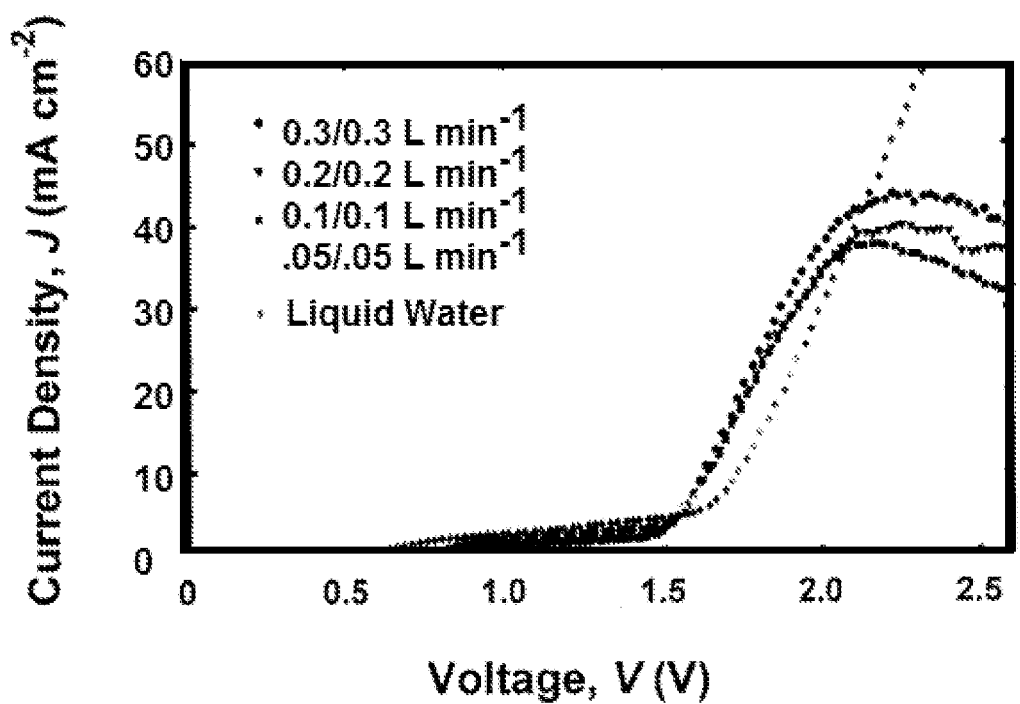
FIG. 6 compares the current density versus applied voltage results for an electrolyzer with liquid water as a feedstock and for a gas with water vapor as the feedstock.

The current density versus applied voltage (J-V) results are presented in FIG. 6 for the electrolyzer with liquid water as a feedstock and for the Ar(g) saturated with water vapor as the feedstock. The information provided in the legend specifies the gas flow rate to the photoanode/photocathode. The carrier gas was UHP Ar(g) with a RH of 95% in each case, and the operating temperature was 20° C. The data represented by diamonds is the J-V behavior of the electrolyzer immersed in liquid water at 20° C. For J<30 mA cm$^{-2}$, the J-V results were very similar for both the liquid feedstock and the water vapor feedstock. At a given voltage, more current was observed with water vapor as the feedstock than with liquid water as the feedstock. The limiting electrolysis current density increased with increasing Ar(g)/H$_2$O(g) flow rate, from a value of ~25 mA cm$^{-2}$ at 0.05 L min$^{-1}$ to ~40 mA cm$^{-2}$ at a flow rate of 0.3 L min$^{-1}$ to each electrode. In contrast, when immersed in liquid water, the electrolyzer did not reach a limiting current density within the experimentally measured voltage range.

Since a solar fuels generator constructed as disclosed above can provide a voltage of around 1.5-2.0 V depending on the structure and materials used in the photoanode light absorber and the photocathode light absorber, the results show that electrolysis in a solar illuminated solar fuels generator can sustained electrolysis at a current density of J=10-20 mA cm$^{-2}$ with water vapor as the feedstock. Further, the flux of water molecules to the separator limited the current density at higher current densities. However, higher flow rates of humidified gas to the electrolyzer can provide an increased mass flux of water to the separator surface, reducing the effect of mass transport limitations. For instance, increasing the flow rate of humidified Ar(g) to each electrode, from 0.05 L min$^{-1}$ to 0.3 L min$^{-1}$, increased the limiting electrolysis current density by ~60% (from 25 mA cm$^{-2}$ to 40 mA cm$^{-2}$). These results are lower bounds on the attainable current density in such a system because no gas diffusion layer was used and the graphite end plates were directly attached to the catalyst layer, so only the portion (~80%) of the catalyst that was directly exposed to the gases, and then only the fraction that was within useful electrical contact laterally to the electrodes, was electrochemically active as configured in this test system.

Example 2

Figure 7:
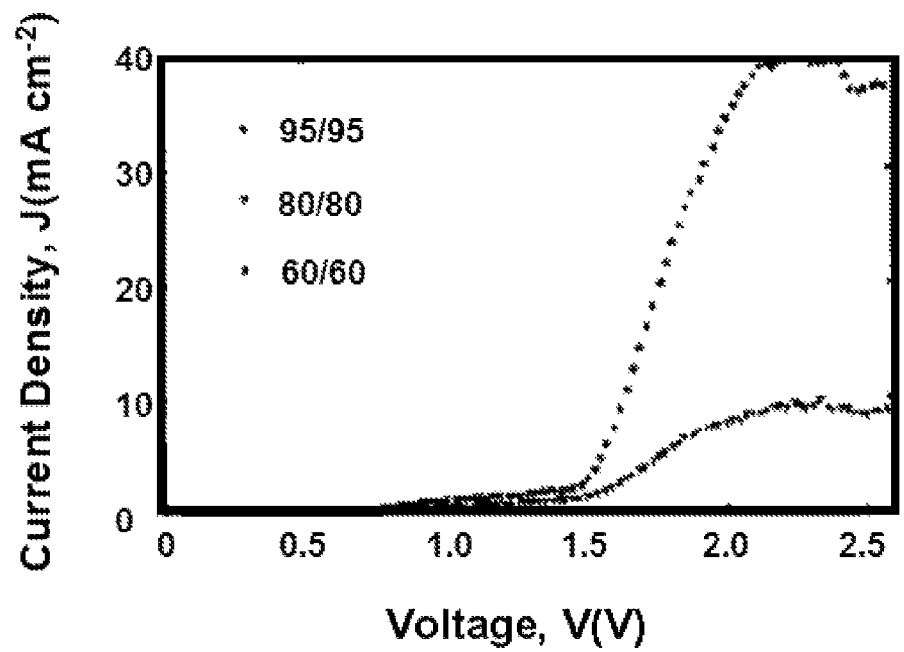
FIG. 7 compares the current density versus applied voltage results for an electrolyzer operating on gas feedstocks with different relative humidity values.

Current density versus applied voltage (J-V) results are presented in FIG. 7 for the electrolyzer using Ar(g) carrier gas with water vapor as the feedstock. The relative humidity of the input carrier gas was varied. The information provided in the legend specifies the relative humidity of the gas stream to the photoanode/photocathode. As is evident from the legend, this data was generated for equal levels of relative humidity on both sides of the separator. In each case, the carrier gas was UHP Ar(g) at a flow rate of 0.2 L min$^{-1}$ in each case, and the operating temperature was 20° C.

These results show that decreases in relative humidity can reduce electrolysis performance. The data also shows that very low levels of electrolysis current sustained at a relative humidity of ≥60%. Without being bound to theory, it is believed that the drop in the electrolysis performance may be due to drying of the separator.

Example 3

Figure 8:
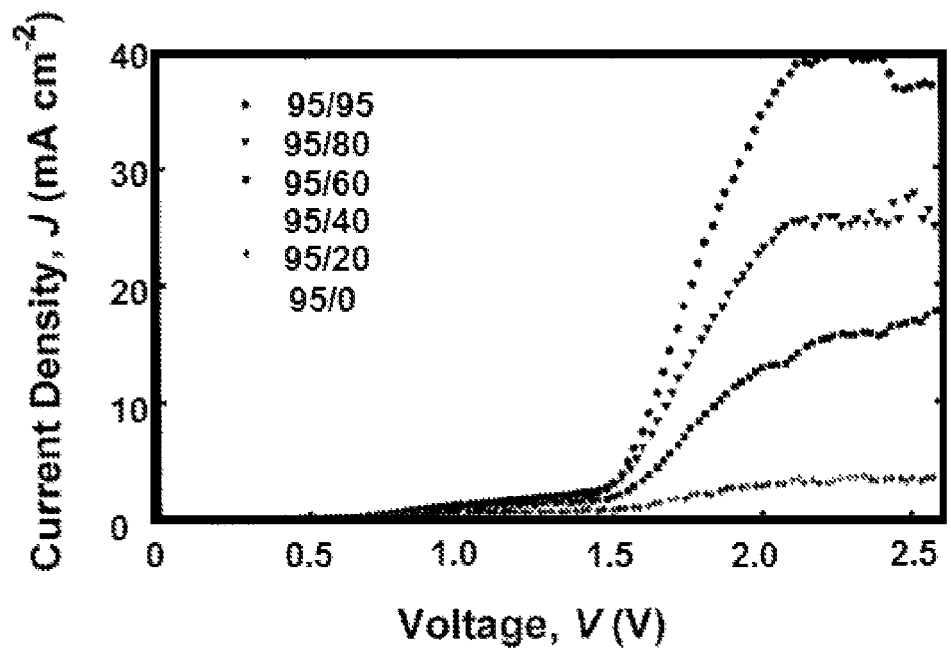
FIG. 8 compares the current density versus applied voltage results for an electrolyzer operating on gas feedstocks with different relative humidity values.

Current density versus applied voltage (J-V) results are presented in FIG. 8 for the electrolyzer using Ar(g) carrier gas with water vapor as the feedstock. The relative humidity of the input carrier gas was varied in the second phase but not in the first phase. The information provided in the legend of FIG. 8 specifies the relative humidity of the gas stream to the photoanode/photocathode.

Figure 9:
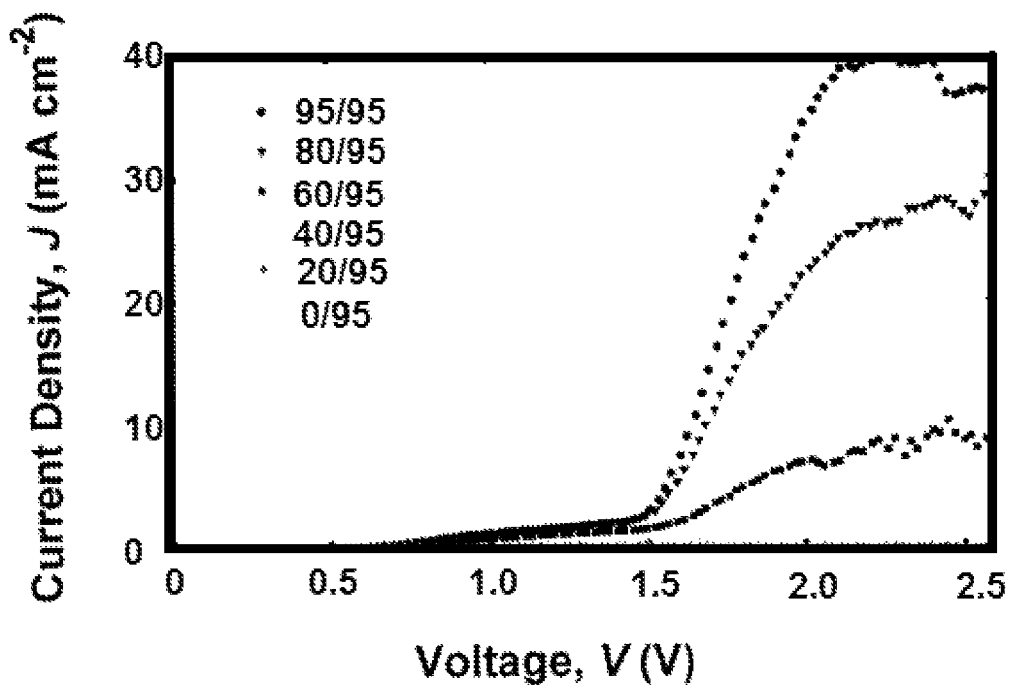
FIG. 9 compares the current density versus applied voltage results for an electrolyzer operating on gas feedstocks with different relative humidity values.

Current density versus applied voltage (J-V) results are presented in FIG. 9 for the electrolyzer using Ar(g) carrier gas with water vapor as the feedstock. The relative humidity of the input carrier gas was varied in the first phase but not in the second phase. The information provided in the legend of FIG. 9 specifies the relative humidity of the gas stream to the photoanode/photocathode.

The difference between the J-V behavior when reducing humidity at the photocathode (FIG. 8) and reducing humidity at the photoanode (FIG. 9) was fairly minor, the electrolyzer performed somewhat better when the relative humidity was reduced at the photocathode. This result may occur because water is decomposed at the photoanode and accordingly lowers the water content at the photoanode as compared to the photocathode.

Example 4

Figure 10:
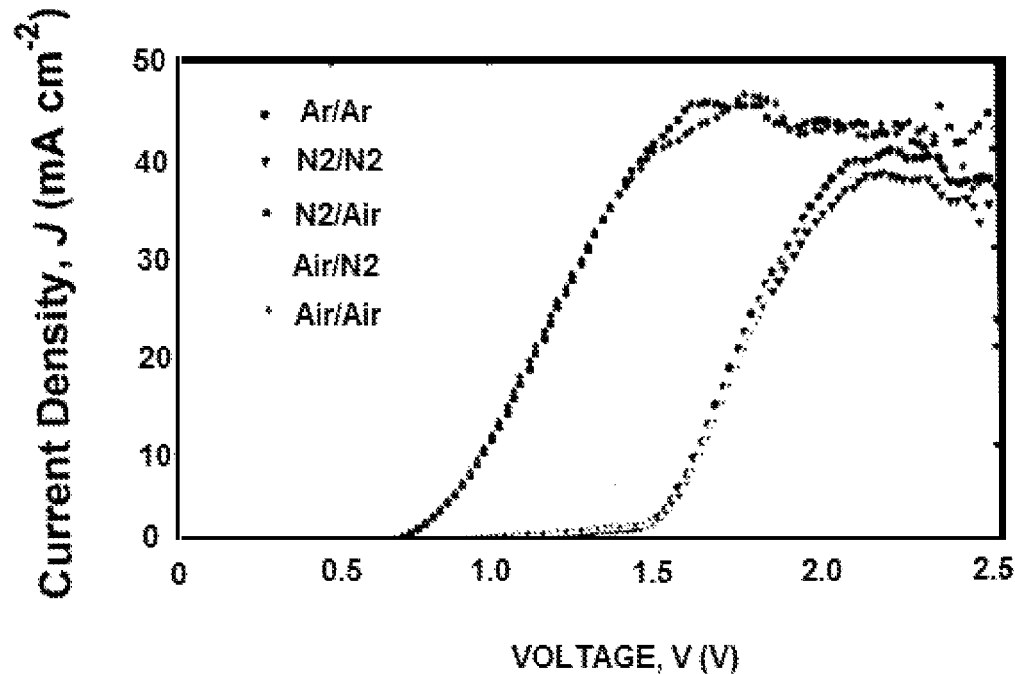
FIG. 10 compares the current density versus applied voltage results for an electrolyzer operating on different carrier gasses.

Current density versus applied voltage (J-V) results are presented in FIG. 10 for the electrolyzer when varying different carrier gasses in the first phase and the second phase. For instance, the carrier gas was varied between Argon gas (UHP Ar(g)) (>99.99%), $N_2$ (g) (>99.99%) or house air (1.10±0.15 ppth of water vapor). The legend specifies the carrier gas delivered to the photoanode/photocathode. The addition of $O_2$ (g) in air to the carrier gas feed to the photoanode appears to have little effect on the behavior of the electrolyzer. However, the presence of $O_2$ (g) in air at the photocathode had a strong effect on the J-V behavior of the electrolyzer.

These results indicate that when $O_2$ (g) in air is delivered to the photocathode, the photocathode is essentially performing the opposite reaction to the photoanode, reducing $O_2$ (g) back into water by combining $O_2$ (g) with protons coming from the separator. The onset of current occurred for V greater than 500 mV, rather than at 0 V, due to the catalytic overpotential. Because the reduction of $O_2$ (g) is thermodynamically favored relative to $H_2$ (g) evolution, the steady-state flux of $O_2$ (g) to the catalyst sites at the photocathode impairing overall cell efficiency. The results also indicate that above 1.5 V, $H_2$ (g) evolution occurs at the photocathode and competes kinetically with $O_2$ (g) reduction in consuming protons. If $H_2$ (g) is produced rapidly enough relative to the input air flow rate, the $H_2$ (g) could purge the $O_2$ (g) from the catalyst surface, ensuring maximum $H_2$ (g) production. The $H_2$ (g) will need to be separated from any $O_2$ (g) in the photocathode effluent downstream before the gases recombine to form water. If no $O_2$ (g) is input to the photocathode, the photocathode should self-purge and become depleted of $O_2$ (g), except for the steady-state $O_2$ (g) crossover from the photoanode. Therefore, while it is possible to expose the photoanode of a water vapor photoelectrolysis system to the atmosphere during operation in the field, the introduction of air to the photocathode is desirable under conditions for which the reduction of $O_2$ (g) is not replacing the evolution of $H_2$ (g).

Although the solar fuels generator is disclosed as being used in combination with a gaseous first phase and a gaseous second phase, the first phase and/or the second phase can be a fluid, liquid, or solid.

Example 5

A solar fuel generator according to FIG. 4B and FIG. 3C was fabricated with one power generating component and one fuel forming component. A triple junction silicon wafer (2"×2") was used as the power-generating component. The anode electrical conductor 27 was an indium doped tin oxide film. The cathode electrical conductor 29 was a stainless steel foil. A Nafion film (100 um in thickness) was employed as the separator 10. A titanium mesh (2"×0.5") was employed as the oxidation electrical conductor 52 and a platinum mesh (2"×0.5") was employed as the reduction electrical conductor 56. $IrRuO_x$ was used as an oxidation catalyst 26 and was deposited onto the titanium mesh by spray pyrolysis. Platinum nanoparticles were used as the reduction catalyst 28 and were deposited onto the platinum mesh by electroless deposition. The fuel-forming component was assembled by hot pressing the platinum mesh and titanium mesh onto the Nafion membrane. For a standalone unit cell, silver pastes were employed to provide electrical communication between the platinum mesh and the indium doped tin oxide film and also between the titanium mesh and the stainless steel foil. For a testing unit cell, a silver paste was employed to provide electrical communication between the platinum mesh and the indium doped tin oxide film while conductive copper tapes was employed to connect the titanium mesh and the stainless steel foil through an external ammeter, which was used to monitor the rate of the fuel forming reaction. The angle α was set to 90°. A transparent epoxy was employed to cover the surface of the indium doped tin oxide film and the stainless steel film as a protective layer. The unit cell for solar fuel generator was placed in pure water and illuminated with an ENH bulb calibrated to an illumination intensity of approximately AM1.5. Through >100 hours of testing, the solar fuel generator performance remained relatively stable with a current density of approximately 4.5 mA $cm^{-2}$ of hydrogen and oxygen production.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A solar fuels generator, comprising:
   one or more power generating components and one or more fuel generating components;
   the one or more fuel generating components including a separator having a first surface and second surface located between one or more oxidation catalysts and one or more reduction catalysts;
   an ion conduit that covers at least portions of the one or more reduction catalysts and the one or more oxidation catalysts;
   the one or more power generating components including a pair of electrodes, at least one being a photoelectrode light absorber; and an electrical conduit providing electrical communication between the pair of electrodes and the catalysts;

wherein the separator includes a polymer mesh coated with a conducting polymer material and containing a plurality of photoactive structures that serve as a plurality of photoelectrodes, wherein the conducting polymer is adhered to the polymer mesh substrate to form the separator, wherein the plurality of photoactive structures are embedded in the separator, and wherein all or a subset of the plurality of structures are embedded in the separator extend entirely through the separator.

2. The solar fuels generator of claim 1, wherein a portion of the separator is sufficiently free of the plurality of embedded photoactive structures; wherein this sufficiently free portion of the separator allows for cation or anion conduction.

3. The solar fuels generator of claim 2, wherein the polymer mesh has a pore size of 1-100 μm.

4. The solar fuels generator of claim 2, wherein the polymer mesh has a pore size of greater than 100 μm.

5. A solar fuels generator, comprising:
one or more power generating components and one or more fuel generating components, the one or more power generating components include a photoanode light absorber and a photocathode light absorber;
the one or more fuel generating components including a separator having a first surface and second surface located between one or more oxidation catalysts and one or more reduction catalysts;
an anode electrical conduit providing electrical communication between the photoanode light absorber and the one or more oxidation catalyst, wherein the anode electrical conduit includes an anode electrical conductor that is optically transparent and is positioned over a surface of the photoanode light absorber such that the anode electrical conductor is over between 5% to 100% of the surface of the photoanode light absorber;
a cathode electrical conduit providing electrical communication between the photocathode light absorber and the one or more reduction catalysts;
an ion conduit covers at least portions of the one or more reduction catalysts and the one or more oxidation catalysts;
the one or more power generating components including a pair of electrodes, at least one being a photoelectrode light absorber; and
an electrical conduit providing electrical communication between the pair of electrodes and the one or more oxidation catalysts and the one or more reduction catalysts.

6. A solar fuels generator, comprising:
one or more power generating components and one or more fuel generating components;
the one or more fuel generating components including a separator having a first surface and second surface located between one or more oxidation catalysts and one or more reduction catalysts;
a cation conduit that covers at least portions of the one or more reduction catalysts and the one or more oxidation catalysts;
the one or more power generating components including a pair of electrodes, at least one being a photoelectrode light absorber; and
an electrical conduit providing electrical communication between the pair of electrodes and the one or more oxidation catalysts and one or more reduction catalysts;
wherein the cation conduit is substantially non-conductive to entities selected from the group consisting of anions, nonionic atoms, non-ionic compounds and any combination thereof.

7. The solar fuels generator of claim 6, wherein
the pair of electrodes includes a photoanode light absorber and a photocathode light absorber;
an anode electrical conduit providing electrical communication between the photoanode light absorber and the one or more oxidation catalyst; and
a cathode electrical conduit providing electrical communication between the photocathode light absorber and the one or more reduction catalyst.

8. The solar fuels generator of claim 7, wherein the anode electrical conduit is in direct physical contact with the photoanode light absorber and the cathode electrical conduit is in direct physical contact with the photocathode light absorber.

9. The solar fuels generator of claim 7, wherein the anode electrical conduit includes an oxidation side electrical conductor in contact with a layer that includes the one or more oxidation catalysts, the oxidation side electrical conductor being porous.

10. The solar fuels generator of claim 9, wherein the porous oxidation side electrical conductor includes a component selected from a group consisting of metal mesh, metal nanowires, conductive carbon cloth, carbon fibers, and carbon nanotubes.

11. The solar fuels generator of claim 10, wherein the anode electrical conduit includes an anode electrical conductor that is optically transparent.

12. The solar fuels generator of claim 7, wherein the cathode electrical conduit includes a reduction side electrical conductor in contact with a layer that includes the one or more reduction catalysts, the reduction side electrical conductor being porous.

13. The solar fuels generator of claim 12, wherein the porous reduction side electrical conductor includes a component selected from a group consisting of metal mesh, metal nanowires, conductive carbon cloth, carbon fibers, and carbon nanotubes.

14. The solar fuels generator of claim 12, wherein the cathode electrical conduit includes a cathode electrical conductor that is optically transparent.

15. The solar fuels generator of claim 7, wherein the cathode electrical conduit includes an cathode electrical conductor that is optically transparent and is positioned over a surface of the photocathode light absorber such that the cathode electrical conductor is over between 5% to 100% of the surface of the photocathode light absorber.

16. The solar fuels generator of claim 7, wherein a layer that includes the one or more oxidation catalysts is not in direct physical contact with the photoanode light absorber.

17. The solar fuels generator of claim 7, wherein a layer that includes the one or more reduction catalysts is not in direct physical contact with the photocathode light absorber.

18. The solar fuels generator of claim 7, wherein a layer that includes the one or more oxidation catalysts cover between 1% to 100% of a surface of the separator.

19. The solar fuels generator of claim 7, wherein the one or more oxidation catalysts covers between 1 to 100% of the first surface of the separator.

20. The solar fuels generator of any one of claim 6, wherein the separator is an ionomer.

21. The solar fuels generator of claim 20, where the ionomer is a sulfonated tetrafluoroethylene based fluoropolymer-copolymer.

22. The solar fuels generator of claim 6, wherein the first surface of the separator is coated with the one or more reduction catalysts.

23. The solar fuels generator of claim 22, wherein the one or more reduction catalysts are in contact with the photoelectrode light absorber.

24. The solar fuels generator of claim 6, wherein the second surface of the separator is coated with the one or more oxidation catalysts.

25. The solar fuels generator of claim 24, wherein the one or more oxidation catalysts are in contact with the photoelectrode light absorber.

26. The solar fuels generator of claim 6, wherein each of the one or more power generating components contacts a first phase and a second phase and each of the one or more fuel generating components contacts the first phase and the second phase.

27. The solar fuels generator of claim 6, wherein one or more power generating components and one or more fuel generating components are linked together so as to form a barrier between a first phase and a second phase.

28. The solar fuels generator of claim 27, wherein the barrier consists of the one or more power generating components and one or more fuel generating components.

* * * * *